US006978154B1

United States Patent
Ospalak et al.

(10) Patent No.: US 6,978,154 B1
(45) Date of Patent: Dec. 20, 2005

(54) SYSTEM FOR INTERFACING A CONVENTIONAL TELEPHONE INSTALLATION TO A WIRELESS TELEPHONE NETWORK

(75) Inventors: Stephen Sean Ospalak, Thornhill (CA); Robert E. Blumenthal, North York (CA); George Kaichis, Unionville (CA); David Charles Haw, Markham (CA); Hiroaki Okumura, Toronto (CA)

(73) Assignee: Telus Communications Inc., Burnaby (CA)

( * ) Notice: Subject to any disclaimer, the term of this patent is extended or adjusted under 35 U.S.C. 154(b) by 709 days.

(21) Appl. No.: 09/680,021

(22) Filed: Oct. 5, 2000

(30) Foreign Application Priority Data

Aug. 16, 2000 (CA) .................................. 2316076

(51) Int. Cl.[7] .............................................. H04M 1/00
(52) U.S. Cl. ...................... 455/557; 455/417; 455/445; 455/575.1; 455/90.3
(58) Field of Search ................................ 455/557, 462, 455/79.1, 554, 11.1, 555, 90, 525, 550, 422, 455/426, 465, 424, 412, 417, 445, 575, 560, 455/414–415, 416, 461, 552–553, 432, 435, 455/420, 459, 575.1–575.9, 90.3, 550.1, 455/552.1, 554.1, 554.2, 556.1, 556.2, 74.1, 455/486.1–486.6; 379/210–212, 399, 199–200, 379/201

(56) References Cited

U.S. PATENT DOCUMENTS

| 4,658,096 A | 4/1987 | West, Jr. et al. |
| 4,718,080 A | 1/1988 | Serrano et al. |
| 4,737,975 A | 4/1988 | Shafer |
| 4,775,997 A | 10/1988 | West, Jr. et al. |
| 4,922,517 A | 5/1990 | West, Jr. et al. |
| 5,117,450 A | 5/1992 | Joglekar et al. |
| 5,134,651 A | 7/1992 | Ortiz et al. |

(Continued)

FOREIGN PATENT DOCUMENTS

CA    1250380    2/1989

(Continued)

OTHER PUBLICATIONS

"QUALCOMM", QCT-1200™, CDMA Digital Telephone User's Guide, 80-68300-1; Rev. A, QUALCOMM Incorporated, San Diego, California, U.S.A.

*Primary Examiner*—Pablo N. Tran
(74) *Attorney, Agent, or Firm*—Christensen O'Connor Johnson Kindness PLLC

(57) ABSTRACT

The present invention features a docking station for connecting a conventional wireline telephone or system of conventional telephones to one or more handheld wireless telephones, enabling a conventional wireline telephone to send calls to and receive calls from a wireless telephone network. This arrangement can eliminate the requirement for a separate wireline telephone service. The wireless telephone may be easily removed from the docking station for independent use as a mobile wireless telephone. The docking station is provided with a specially configured removable connecting sleeve which may be used to connect a particular make and model of handheld wireless telephone to the docking station. The docking station may comprise more than one connecting sleeve so that more than one handheld wireless telephone may be accessed by a wireline telephone connected to the docking station. Docking station circuitry simulates the familiar conventional wireline telephone environment so that a conventional wireline telephone may access the wireless network in the same manner that landline telephone network is accessed.

27 Claims, 18 Drawing Sheets

U.S. PATENT DOCUMENTS

| | | | |
|---|---|---|---|
| 5,361,297 A | 11/1994 | Ortiz et al. | |
| D354,749 S | 1/1995 | Phillips | |
| 5,555,448 A * | 9/1996 | Thiede et al. | 455/74.1 |
| 5,715,296 A | 2/1998 | Schornack et al. | |
| 5,812,637 A | 9/1998 | Schornack et al. | |
| 5,903,833 A * | 5/1999 | Jonsson et al. | 455/417 |
| 5,915,224 A * | 6/1999 | Jonsson | 455/552.1 |
| 5,933,774 A * | 8/1999 | Bertocci | 455/417 |
| 5,946,616 A | 8/1999 | Schornack et al. | |
| 6,035,220 A | 3/2000 | Claudio et al. | |
| 6,044,267 A * | 3/2000 | Foladare et al. | 455/426.1 |
| 6,240,297 B1 * | 5/2001 | Jadoul | 455/466 |
| 6,253,088 B1 * | 6/2001 | Wenk et al. | 455/462 |
| 6,295,456 B1 * | 9/2001 | Baker et al. | 455/463 |
| 6,343,220 B1 * | 1/2002 | Van Der Salm | 455/552.1 |
| 6,466,799 B1 * | 10/2002 | Torrey et al. | 455/462 |
| 6,470,187 B1 * | 10/2002 | Rosen et al. | 455/465 |
| 2002/0106993 A1 * | 8/2002 | Shealtiel | 455/74.1 |

FOREIGN PATENT DOCUMENTS

| | | | |
|---|---|---|---|
| CA | 2108581 | 10/1992 | |
| CA | 2226431 | 1/1998 | |
| EP | 660628 A2 * | 6/1995 | H04Q 7/32 |
| WO | WO 9523485 A1 * | 8/1995 | H04Q 7/20 |

* cited by examiner

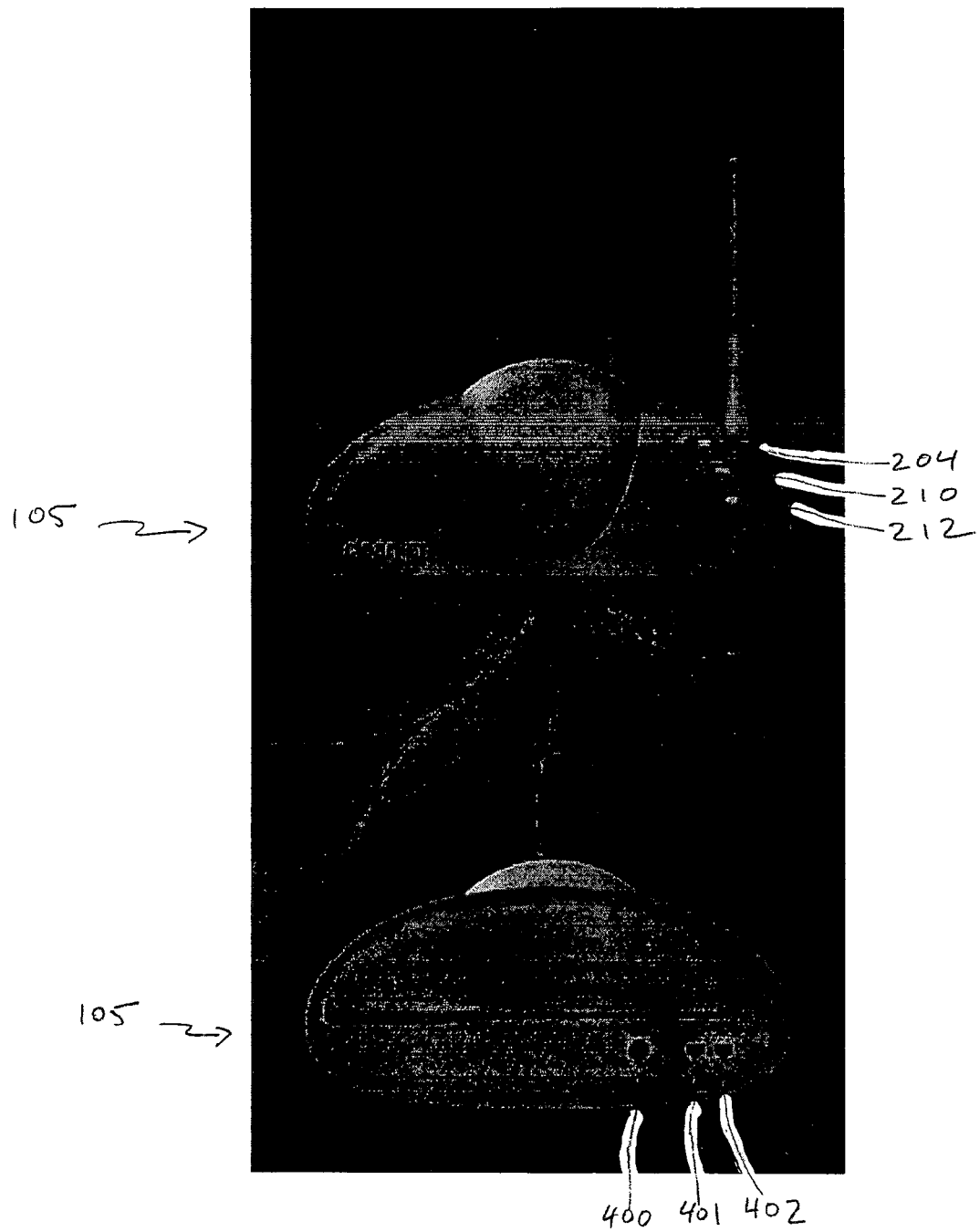
Figure 3 (top diagram) and Figure 4 (bottom diagram)

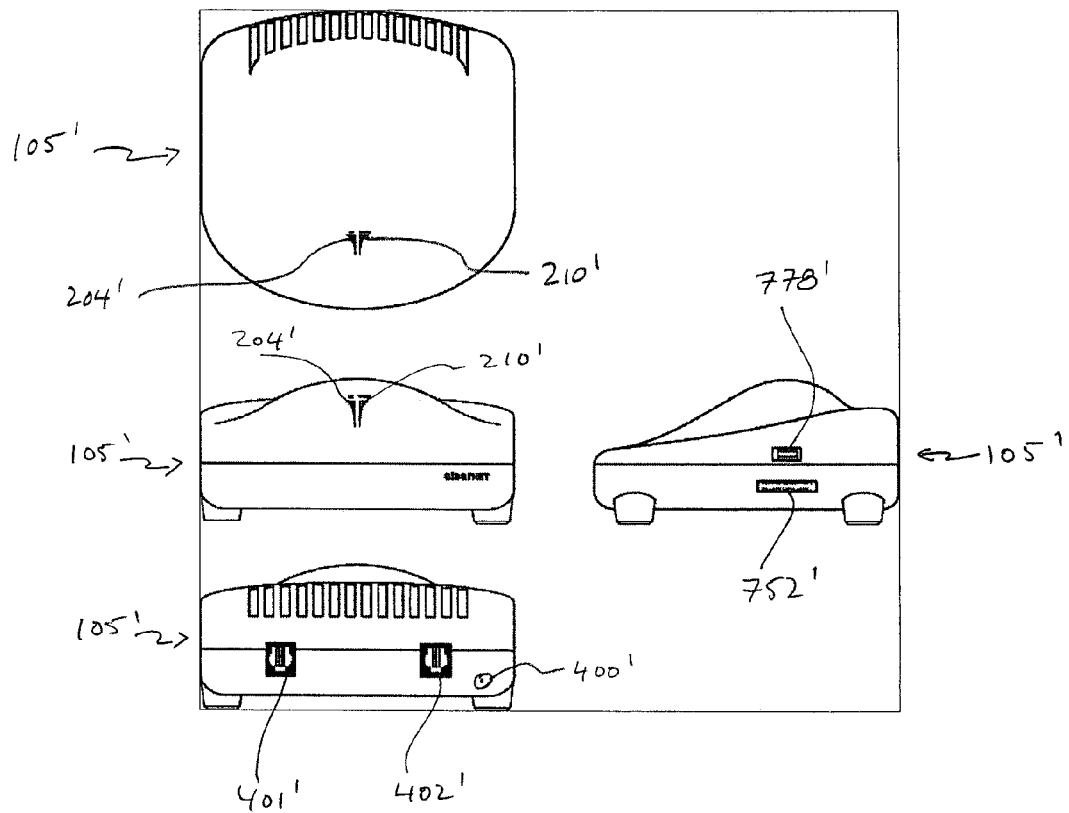
Figure 18 (top diagram), Figure 19 (middle left diagram), Figure 20 (bottom diagram) and Figure 21 (middle right diagram)

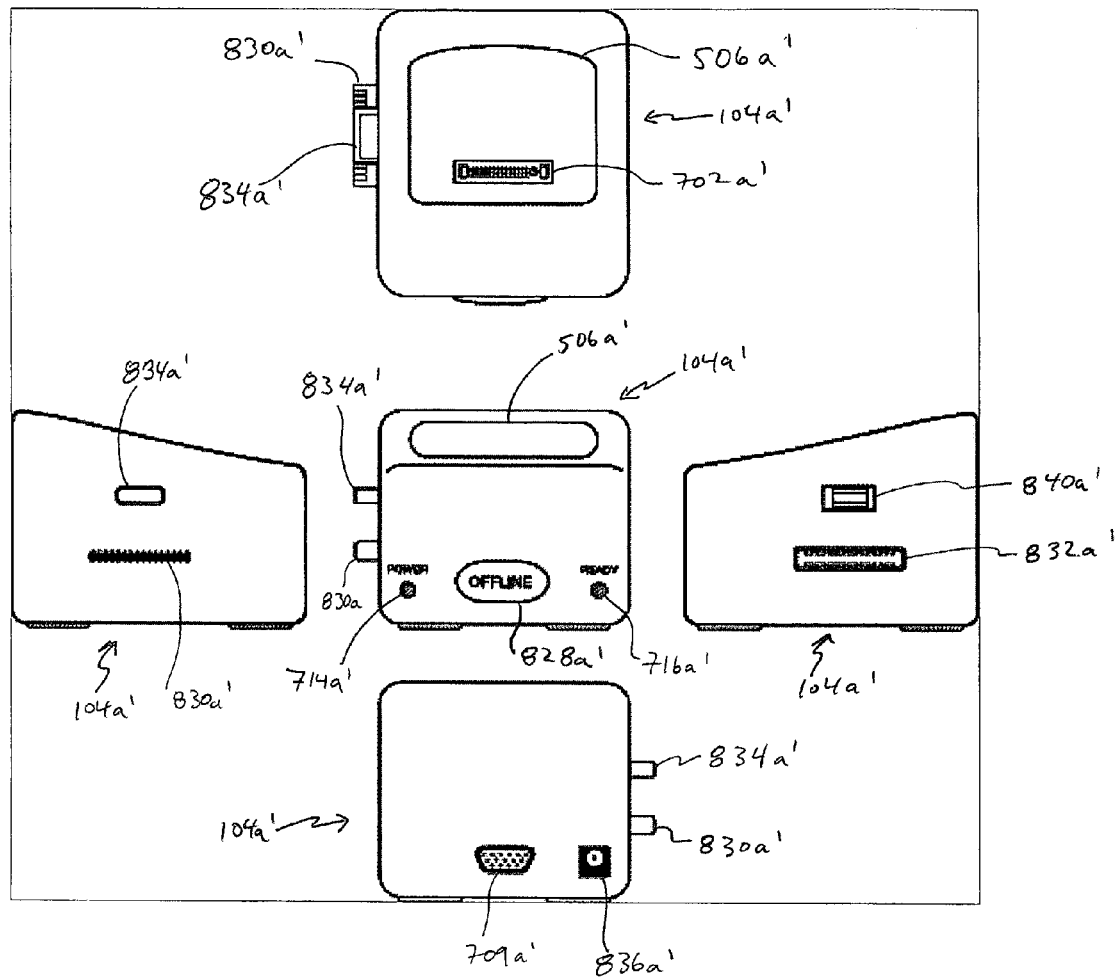
Figure 22 (top diagram), Figure 23 (middle left diagram), Figure 24 (middle diagram), Figure 25 (middle right diagram) and Figure 26 (bottom diagram)

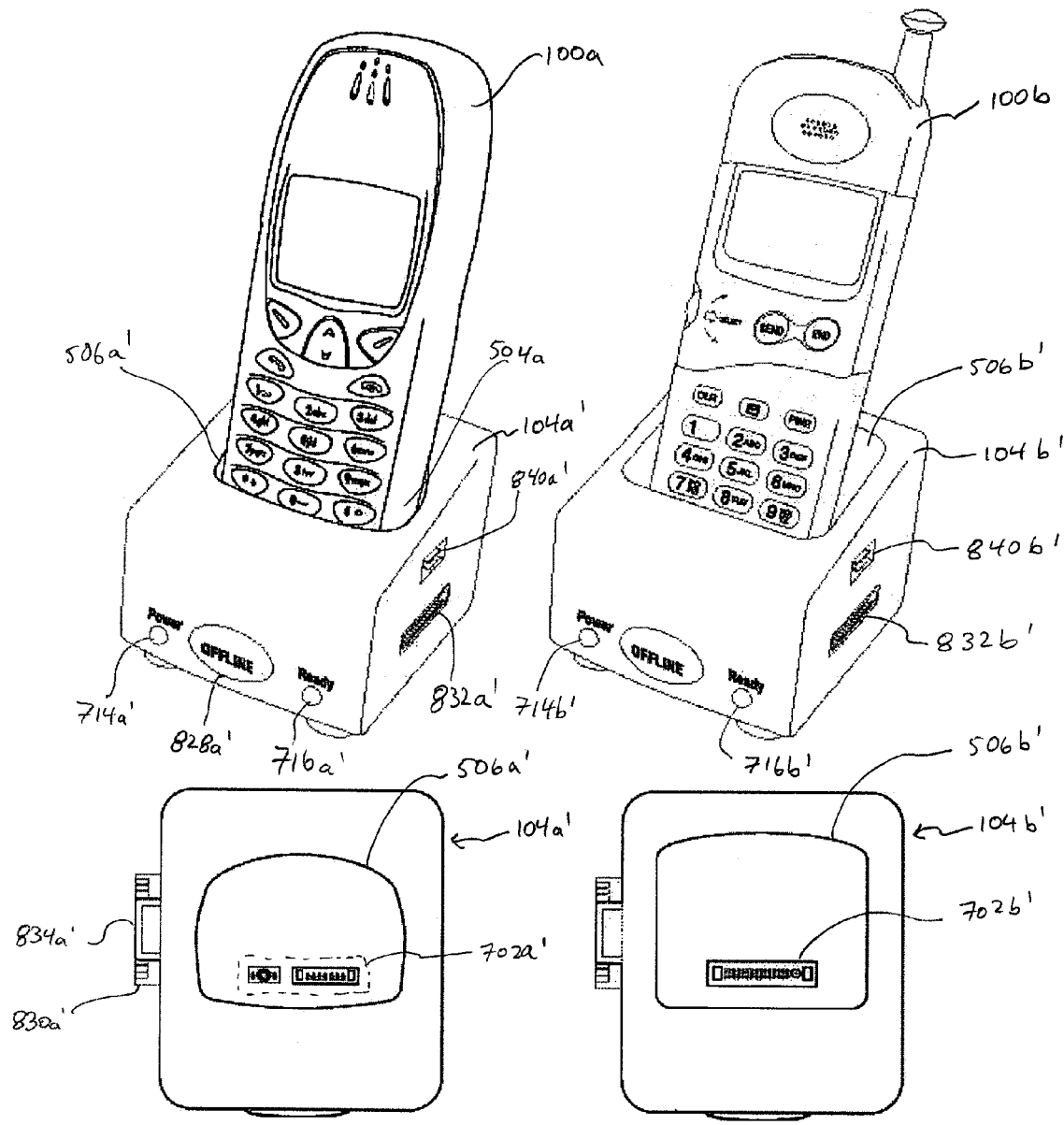
Figure 29 (top left), Figure 30 (bottom left), Figure 31 (top right), Figure 32 (bottom right)

SYSTEM FOR INTERFACING A CONVENTIONAL TELEPHONE INSTALLATION TO A WIRELESS TELEPHONE NETWORK

FIELD OF THE INVENTION

The field of the invention relates generally to electronic telecommunications devices, systems and methods for interfacing between wireline and wireless telephones.

BACKGROUND OF THE INVENTION

Conventional ("wireline") telephone systems require a physical connection (a "landline") to be established between the telephone unit and the local telephone company central office. These systems are particularly expensive in rural areas where costly transmission lines must be constructed. Wireline telephones include those that are connected by copper wire, fibre optics, and cable and are not limited to simply metallic connections.

Since conventional wireline telephone systems are fixed in place, those who require the use of a mobile telephone often must incur additional expense by subscribing to a cellular telephone service and by purchasing new telephone equipment to connect to a wireless telephone network, such as a cellular telephone network. In addition to the increased cost, users often require two telephone numbers, one for each of the wireline telephone service and the wireless telephone service. This requirement for multiple numbers can be inconvenient.

Another type of telephone system is comprised of a conventional telephone design internally configured to access a wireless telephone network. A Qualcomm™ QCT-1200 is an example of such a product. While this system avoids the need for costly transmission wires, its limited features make it truly beneficial only in applications where landlines do not exist. At least one Qualcomm telephone model permits the addition of a wireline telephone extension to the wireless unit.

Similarly, Canadian patent no. 1250380 issued Feb. 21, 1989 to West and Shafer and U.S. Pat. No. 4,658,096 (issued Apr. 14, 1987 to West and Shafer), U.S. Pat. No. 4,737,975 (issued Apr. 12, 1988 to Shafer), U.S. Pat. No. 4,775,997 (issued Oct. 4, 1988 to West and Shafer), U.S. Pat. No. 4,922,517 (issued May 1, 1990 to West and Shafer) and U.S. Pat. No. 5,117,450 (issued May 26, 1992 to Joglekar and Aseltine) also disclose an interface that permits an existing conventional wireline telephone to access a wireless telephone network. The interface simulates the conventional wireline telephone environment for users that are not comfortable with wireless telephone functionality. Features such as a dial tone generator and simulated ring tones achieve this end. However, this system also suffers from the limitation that it is not portable and therefore can not take advantage of the mobility that a wireless telephone network affords.

To achieve portability, U.S. Pat. No. 4,718,080 (issued Jan. 5, 1988 to Serrano and Holman) discloses a telephone interface system that may be installed in an automobile or other vehicle permitting a wireline telephone unit to interface with a wireless telephone network.

Alternative systems and methods for interfacing between wireline and wireless telephones are desirable.

SUMMARY OF THE INVENTION

The invention consists of a docking station for interfacing a wireline telephone installation to a handheld wireless telephone. According to one broad aspect of the invention, the docking station has:
 a) translation means for translating communication signals between the handheld wireless telephone and the wireline telephone;
 b) a main controller box;
 c) a releasable connecting module removably connected to the main controller box, the releasable connecting module being used to connect the handheld wireless telephone to the main controller box; and
 d) wired means for connecting the docking station to the wireline telephone.

According to another broad aspect of the invention, there is provided a handheld wireless telephone system, comprising a handheld wireless telephone, a wireline telephone, and a docking station. The docking station has:
 a) translation means for translating communication signals between the handheld wireless telephone and the wireline telephone;
 b) a main controller box;
 c) a releasable connecting module removably connected to the main controller box, the releasable connecting module being used to connect the handheld wireless telephone to the main controller box; and
 d) wired means for connecting the docking station to the wireline telephone.

The wireline telephone is connected to the wired means, and the handheld wireless telephone is connected to the releasable connecting module.

In yet another broad aspect of the invention, there is provided a main controller box for use in association with a releasable connecting module. The main controller box has a means for connecting the main controller box to the releasable connecting module, a wired means for connecting to a wireline telephone, translation means for translating communication signals between the main controller box and a wireline telephone, and communication means for simulating communication signals in a manner to make it appear to users of the wireline telephone that the wireline telephone is connected to a landline telephone network.

According to another broad aspect of the invention, there is provided a releasable connecting module for use in association with a main controller box. The releasable connecting module has a first data bus connector for connection to a corresponding data bus connector in a handheld wireless telephone and a second data bus connector for connection to a data bus connector in the main controller box. The releasable connecting module may further comprise a translation means for translating communication signals between the main controller box and a predetermined make and model of handheld wireless telephone.

In an illustrative embodiment of the present invention, the communication means may simulate at least the following features available on conventional telephone networks: multi-party conferencing, call hold, call mute, call forwarding, fax notification, net mail notification voice mail, one touch voice mail retrieval, caller identification, short message service and call waiting.

With respect to a further illustrative embodiment of the present invention, the main controller box may also have a data bus connector for connecting to a corresponding data bus connector in the releasable connecting module, and an automatic locking device for connecting to a corresponding automatic locking device of the releasable connecting module.

In a further illustrative embodiment of the present invention, the releasable connecting module may also have a retaining means for retaining the handheld wireless telephone.

The retaining means may comprise a portion of a surface of the releasable connecting module defining a cup. The cup is preferably substantially the same shape and size as a surface of the handheld wireless telephone having a data bus connector. The cup has the first data bus connector for connection to the data bus connector of the handheld wireless telephone, whereby the first data bus connector contacts the data bus connector of the handheld wireless telephone when the handheld wireless telephone is inserted into the cup.

With respect to yet further illustrative embodiments of the present invention, the releasable connecting module may also have a means for connecting to a second releasable connecting module.

BRIEF DESCRIPTION OF THE DRAWINGS

For a better understanding of the present invention and to show more clearly how it may be carried into effect, reference is now made, by way of example, to the accompanying drawings which show preferred embodiments of the present invention and in which:

FIG. 3 is a front view of a main controller box and connecting sleeve utilized in the docking station of FIG. 1, FIG. 4 is a back view of the main controller box and connecting sleeve of FIG. 3, FIG. 18 is a top view of a main controller box utilized in the docking station of FIG. 16, FIG. 19 is a front view of the main controller box of FIG. 16, FIG. 20 is a back view of the main controller box of FIG. 16, FIG. 21 is a side view of the main controller box of FIG. 16, FIG. 22 is a top view of a connecting sleeve utilized in the docking station of FIG. 16, FIG. 23 is a side view of the connecting sleeve of FIG. 16, FIG. 24 is a front view of the connecting sleeve of FIG. 16, FIG. 25 is another side view of the connecting sleeve of FIG. 16, FIG. 26 is a rear view of the connecting sleeve of FIG. 16, FIG. 29 is an isolated perspective view of FIG. 28 showing the first connecting sleeve and a handheld wireless telephone, FIG. 30 is a top view of the connecting sleeve of FIG. 29, FIG. 31 is an isolated perspective view of FIG. 28 showing the second connecting sleeve and a different make and model of handheld wireless telephone than in FIG. 29, and FIG. 32 is a top view of the connecting sleeve of FIG. 31.

DETAILED DESCRIPTION OF THE PREFERRED EMBODIMENTS

Figure 1:
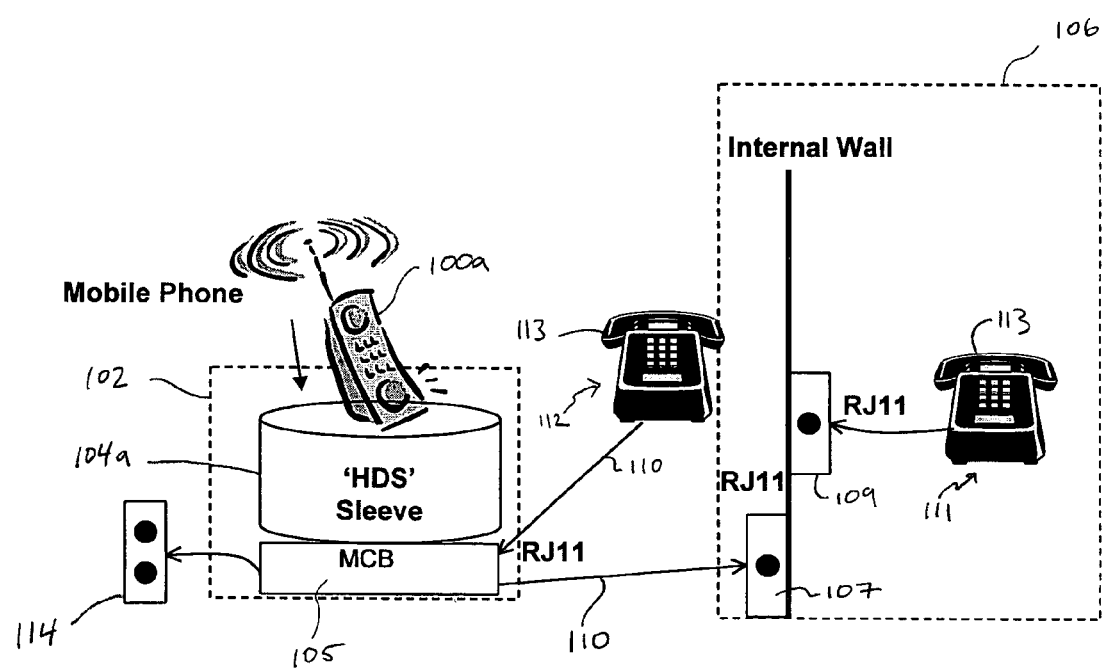
FIG. 1 is a diagram of a typical installation of a docking station according to a first embodiment of the invention.

Referring to FIG. 1, in a first embodiment of the invention, a wireless telephone 100a is connected to a main controller box 105 via a connecting sleeve 104a. The connecting sleeve 104a and the main controller box 105 comprise the docking station 102. The wireless telephone 100a is a handheld wireless telephone 100a. The handheld wireless telephone 100a may be easily disengaged for independent use as a mobile telephone. The docking station 102 interacts directly with the handheld wireless telephone 100a and replicates functions available on the handheld wireless telephone 100a; therefore existing wireless telephone networks may readily be accessed by the docking station 102. In the first embodiment, the docking station 102 is configured to access a digital Personal Communication Services ("PCS") network (not shown). In alternative embodiments, the docking station 102 may also be configured to access one or more wireless communications networks including: Advanced Mobile Phone Service ("AMPS"), Code Division Multiple Access ("CDMA"), Global System for Mobile ("GSM"), Time Division Multiple Access ("TDMA"), and Integrated Digital Enhanced Networks™ ("iDEN™"). An Ethernet adapter (not shown) may also be added to the docking station 102 to enable data communication between a computer or computer network (not shown) connected to the Ethernet adapter, and a wireless telephone network. For the first and second embodiments of the invention, no modification of present wireless telephone networks is required.

The design of the connecting sleeve 104a may be modified so that various makes and models of handheld wireless telephone may be used with the docking station 102.

The docking station 102 powers an existing wireline telephone system 106 via a standard telephone receptacle 401 or 402 (shown in FIG. 4) and telephone cable wire 110. The wireline telephone system 106 may have for example, a telephone jack or other connection 107 to the telephone cable wire 110, and at least one other telephone jack or other connection 109 for connection to a wireline telephone 111. The jacks 107, 109 may be standard RJ-11 telephone jacks.

A standalone wireline telephone 112 may also be connected directly to the docking station 102. The wireline telephones 111, 112 connected to the docking station 102 may be used to answer inbound telephone calls and to initiate outbound telephone calls.

Although a wireline telephone 111, 112 is illustrated, other types of wireline telephone will be suitable for use with the docking station 102. For example, a cordless wireline telephone, not shown, which has a cordless handset and a local base station for connection by wire for receipt and transmission of telephone calls, may be used as a wireline telephone 111, 112.

The docking station 102 is powered by a conventional 120 volt alternating current ("AC") power source 114. Once power is connected to the docking station 102, such as the AC power source 114, the docking station 102 automatically turns on. The docking station 102 may also be equipped with an internal and/or external rechargeable back-up battery, not shown, that supplies electricity to the docking station 102 when the AC power source 114 is interrupted. If a back-up battery pack is used, then circuitry for a low battery alert may also be implemented. Of course, other means of power supply would be evident to those skilled in the art.

The docking station 102 permits the replacement of conventional landline based telephone service with wireless telephone service, while maintaining the use of wireline telephones 112 or systems of wireline telephones 106. Users therefore require just one telephone service, and therefore one telephone number, for both mobile telephone service and telephone service previously provided via a landline. Users are not required to carry or locate the wireless telephone, and more than one user may participate in the telephone conversation through the use of the existing wireline infrastructure such as the system of wireline telephones 106.

The docking station 102 may alternatively be configured to accept more than one connecting sleeve 104a and handheld wireless telephone 100a combination at a time (not shown). This configuration permits multiple users of handheld wireless telephones 100a to take advantage of one docking station 102 installation. Alternatively, multiple docking stations can be connected together to permit the same functionality (not shown).

Figure 2:
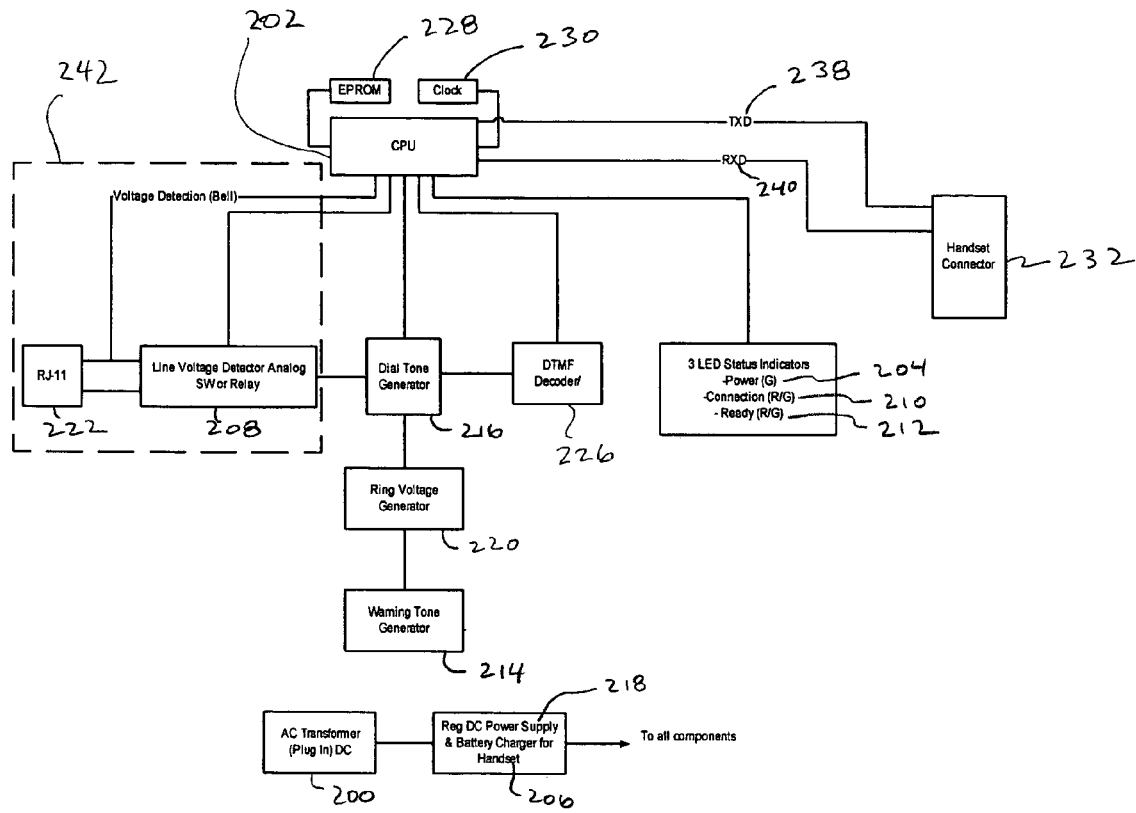
FIG. 2 is a block diagram of the docking station of FIG. 1.

Referring to FIG. 2, an AC to direct current ("DC") transformer 200 converts electricity from the power source 114 to a DC power supply 218 which powers all components of the docking station 102 and also powers any conventional telephone system 106 and/or standalone wireline telephone 112. DC power is also provided to a battery charger 206 which charges a rechargeable battery (not shown) in the handheld wireless telephone 100a.

The battery charger 206 also forms part of docking station 102. The battery charger 206 recharges the wireless telephone 100a as the wireless telephone 100a is seated in the docking station 102. Recharging may be accomplished while the docking station 102 transmits and receives telephone calls and when the docking station 102 is not in use. In either case, the battery charging circuitry 206 recharges the handheld wireless telephone 100a battery in the same timeframe that a conventional battery charger would take to charge a battery in a standalone wireless telephone.

A central processing unit ("CPU") 202 operates based on instructions received from an Electrically Programmable Read Only Memory ("EPROM") 228, which is connected to the CPU 202. The EPROM 228 instructions provide for the operational features described herein, and are encrypted to prevent reverse engineering of the encoded software. A clock 230 is also connected to the CPU 202. The CPU 202 is connected to a handset connector 232 which interfaces with the handheld wireless telephone 100a. In the first embodiment, connector 232 is an edge type connector 232. Data is transmitted and received between the CPU 202 and the handset connector 232 via transmit data 238 and receive data 240 connections.

The docking station 102 connects to a wireline telephone system 106 and/or a standalone wireline telephone 112 via a standard female RJ-11 connector 222. Other connectors 222 may be used as will be evident to those skilled in the art. The docking station 102 may also be configured with a second RJ-11 connector so that a standalone wireline telephone 112 may access the docking station 102 if a conventional telephone system 106 is connected to the first RJ-11 connector. Alternatively, a splitter, not shown, may be connected between RJ-11 connector 222, telephones 112 and telephone system 106. Many alternative configurations would be evident to a person skilled in the art depending upon the requirements of a particular application, such as number of telephones 111, 112, the load of each telephone 111, 112, and physical access to connections to the telephone 112 and the telephone system 106.

In the first embodiment, a direct connection is provided between the CPU 202 and the RJ-11 connector 222 so that voltage in the wireline telephone system 106 may be detected. A line voltage detector 208 is also connected to the RJ-11 connector 222 and the CPU 202 forming a high impedance detection circuit 242, which detects voltage in the conventional telephone system 106.

The CPU 202 is serially connected to a dial tone generator 216, a ring voltage generator 220 and a warning tone generator 214. The dial tone generator 216 is also connected to the line voltage detector 208 and to a dual tone multi-frequency decoder ("DTMF") 226, which in turn is connected to the CPU 202.

Three multi-colored LED status indicators 204, 210, 212 are connected to the CPU 202. Power status LED 204 indicates whether electricity is provided to the docking station 102. Connection status LED 210 indicates whether or not the docking station 102 has successfully made a connection with the wireline telephone system 106 or standalone wireline telephone 112 and whether or not the wireline telephone system 106 is disconnected from the local telephone company central office. If the docking station 102 has power and has made a connection with the wireline telephone system 106 or a standalone wireline telephone 112, then the ready status LED 212 indicates that the docking station 102 is ready to make and receive telephone calls, and that the handheld wireless telephone 100a is turned on and is properly inserted into the docking station 102.

Referring to FIG. 3, the three status indicator LEDs 204, 210 and 212 are grouped on the front surface of the main controller box 105, as described in greater detail below.

Referring to FIG. 4, the rear side of the main controller box 105 is also provided with an electrical power input receptacle 400 and two female RJ-11 telephone connectors 401 and 402. The RJ-11 connectors 401, 402 may be used to connect the docking station 102 to one or more wireline telephone systems 106 and/or standalone conventional telephones 112, as previously described.

Figure 5:
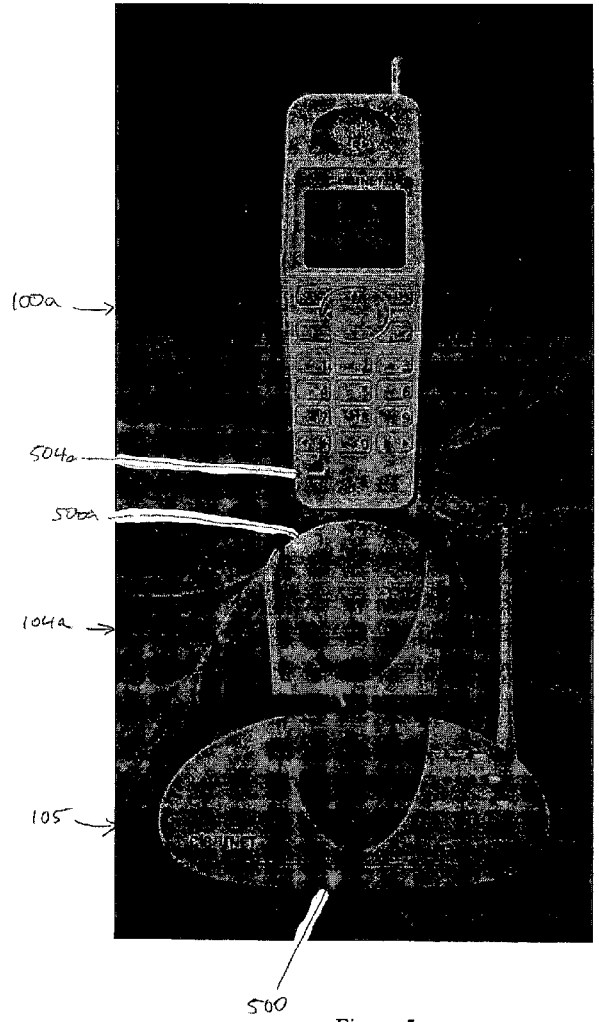
FIG. 5 is a exploded front view of a wireless telephone, and the connecting sleeve and the main controller box of FIG. 3.
Figure 6:
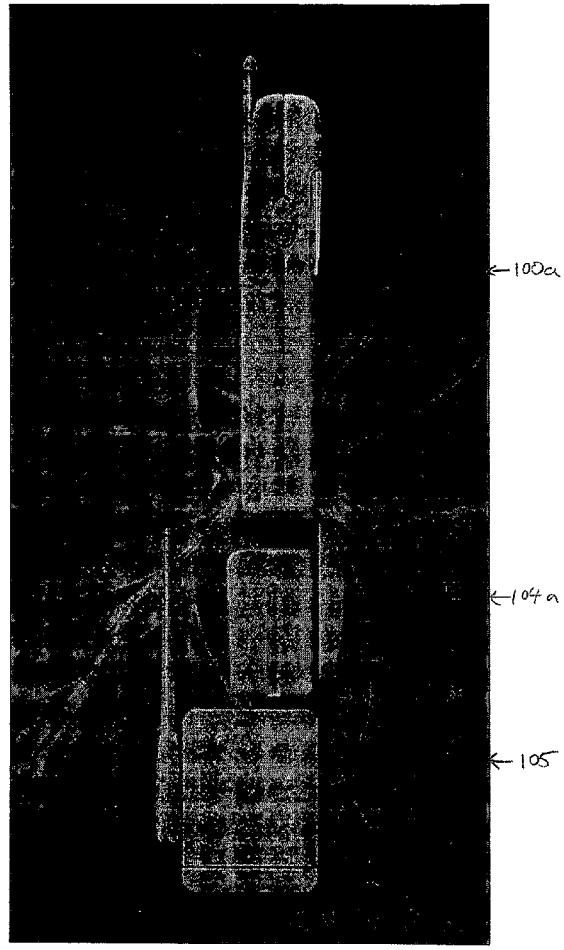
FIG. 6 is a side view of FIG. 5.

FIGS. 5, 6, 7, 8, 9 and 10 illustrate, step-by-step, how the handheld wireless telephone 100a, the connecting sleeve 104a and the main controller box 105 fit together. Referring to FIG. 5, the main controller box 105 is provided with a concave, rectangular receiving surface 500 which engages and secures the closed end of the connecting sleeve 104a. The closed end of the connecting sleeve 104a has a releasable locking mechanism (not shown) that secures the connecting sleeve 104a to the main controller box 105. A release switch, not shown, allows the connecting sleeve 104a to be disengaged from the main controller box 105. The connecting sleeve 104a has a concave, rectangular receiving surface 506a which engages the base 504a of the handheld wireless telephone 100a. The handheld wireless telephone 100a is held in place in the connecting sleeve 104a by gravity and/or friction depending on the type of connector on the handheld wireless telephone 100a.

Many different configurations of connecting sleeve 104a may be implemented to accommodate various makes and models of handheld wireless telephones with a standard main controller box 105, as described in greater detail below.

Figure 7:
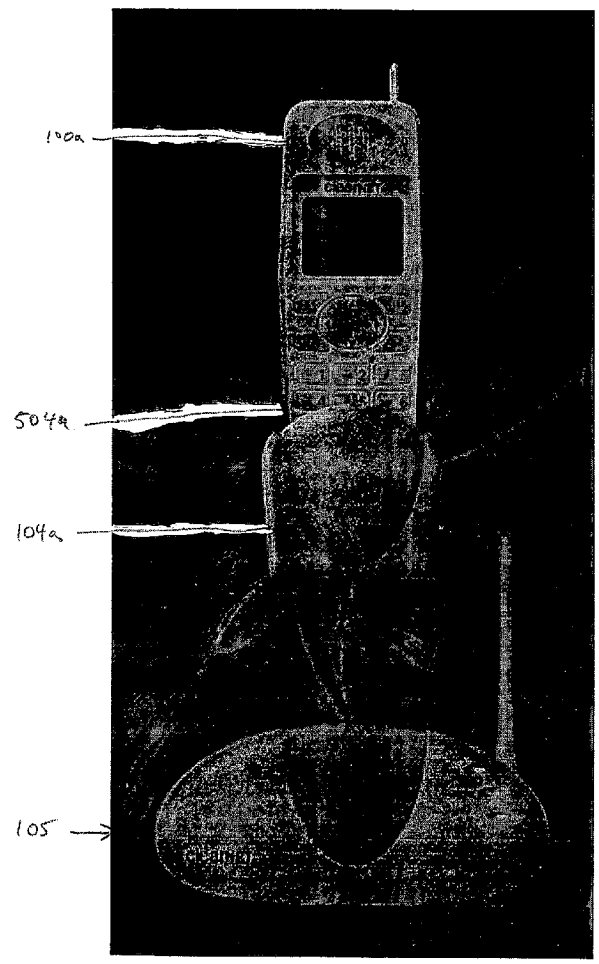
FIG. 7 is a front view of the items in FIG. 5 with the wireless telephone and the connecting sleeve engaged with one another.
Figure 8:
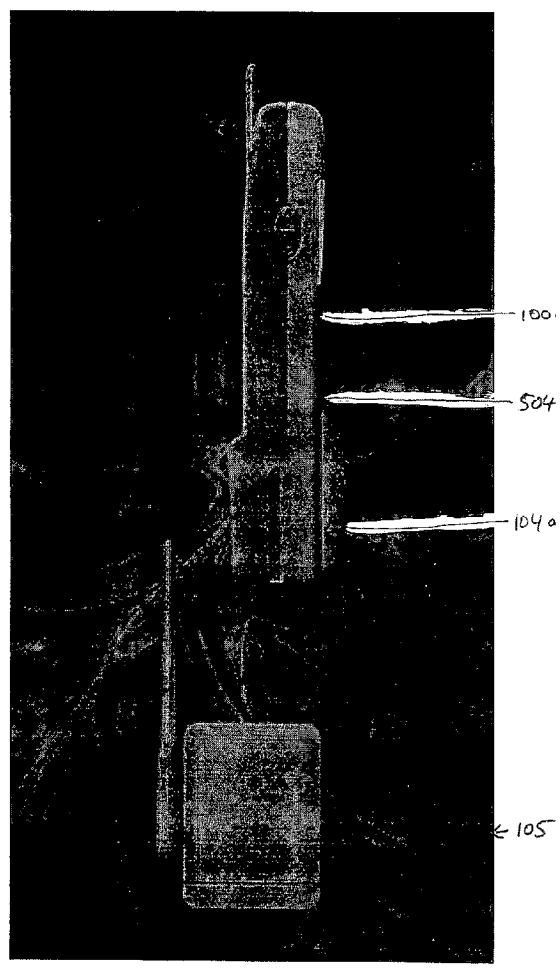
FIG. 8 is a side view of FIG. 7.

Referring to FIGS. 7 and 8, the base 504a of the handheld wireless telephone 100a is shown engaged with the concave receiving surface 506a of the connecting sleeve 104a.

Figure 9:
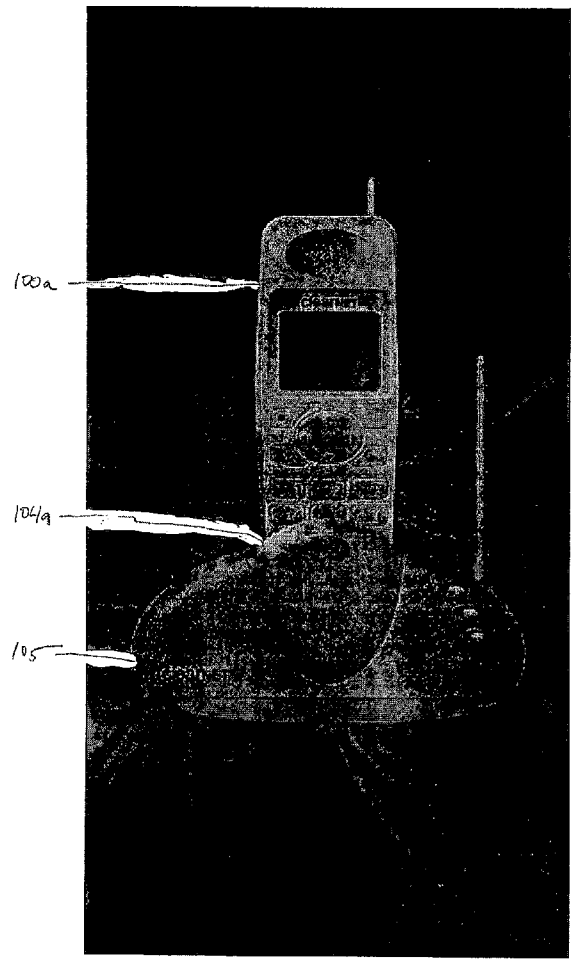
FIG. 9 is a front view of the items of FIG. 5 with the wireless telephone, the connecting sleeve and the main controller box engaged with one another.
Figure 10:
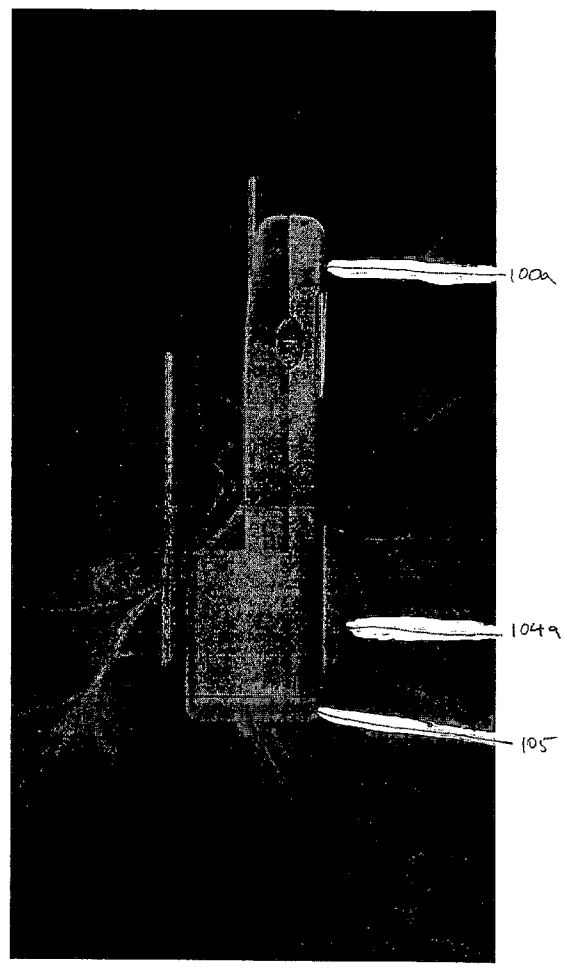
FIG. 10 is a side view of FIG. 9.

Referring to FIGS. 9 and 10, the handheld wireless telephone 100a, the connecting sleeve 104a and the main controller box 105 are mutually engaged and ready for operation.

Figure 11:
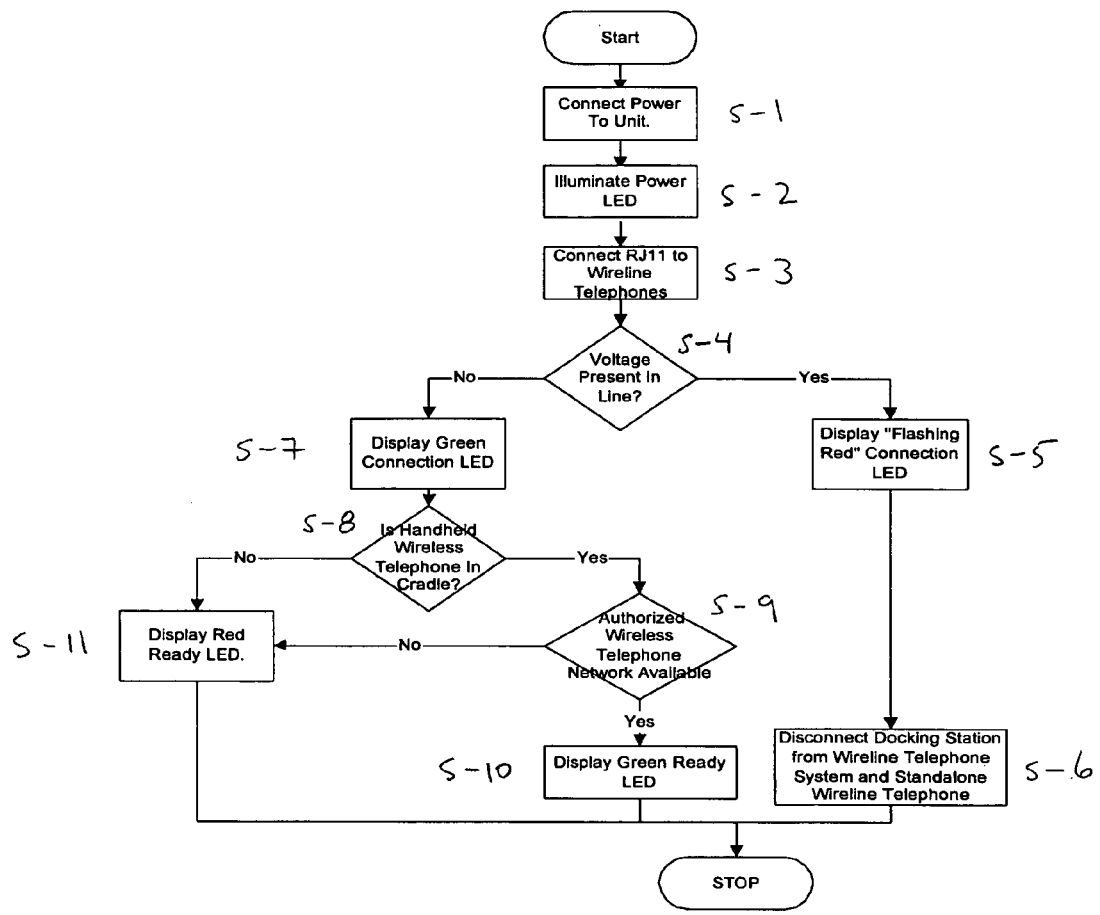
FIG. 11 is a flow chart diagram of installation of the docking station of FIG. 1.

Referring to FIG. 11, the initial start-up routine of the docking station 102 is illustrated. In step S-1, electricity flows from the power source 114 through transformer 200 to the docking station 102. In step S-2, the CPU 202 signals the power status indicator LED 204 to illuminate green if power is supplied to the system. If no power is available, the power status indicator LED 204 remains off. One or both of the RJ-11 telephone jacks 401, 402 are used in step S-3 to connect the docking station 102 to a wireline telephone system 106 and/or a standalone conventional telephone 112.

In conjunction with the line voltage detector 208, the CPU 202 evaluates whether voltage is present in the wireline. If voltage is present, then the CPU 202 instructs the connection status indicator LED 210 to display a flashing red warning light as indicated in step S-5. The CPU 202 then signals the line voltage detector 208 to electronically disconnect the docking station 102 from the wireline telephone system 106 (step S-6). A relay or similar method is used to totally isolate the docking station 102 from the wireline telephone system 106. The docking station 102 will not operate if landline telephone service is also connected to the wireline telephone system 106.

If voltage is not present in the wireline telephone system 106 in step S-4, the connection status LED 210 illuminates green (step S-7). The CPU 202 then signals the handset connector 232 to determine if the handheld wireless telephone 100a is turned on and is properly engaged with the connecting sleeve 104a and main controller box 105 (step S-8). If the handheld wireless telephone 100a is set properly in the connecting sleeve 104a and an authorized wireless telephone network is available (step S-9), then the CPU 202 signals the ready status indicator LED 212 to turn green (step S-10). The CPU 202 also signals the dial tone generator 216 to send a dial tone signal to any connected wireline telephone 111, 112 that has its receiver 113 lifted. When a telephone call is in progress, the CPU 202 will signal the ready status indicator LED 212 to flash green on and off repeatedly. If the handheld wireless telephone 100a is not set properly, or not turned on (step S-8), or if a wireless telephone network is not available (step S-9), then the CPU 202 signals the ready status indicator LED 212 to turn red (step S-11). If a receiver 113 of any telephone 111, 112 connected to the docking station 102 is lifted, no sound is generated by the docking station 102 and the docking station 102 can not be used to send and receive telephone calls.

Figure 12:
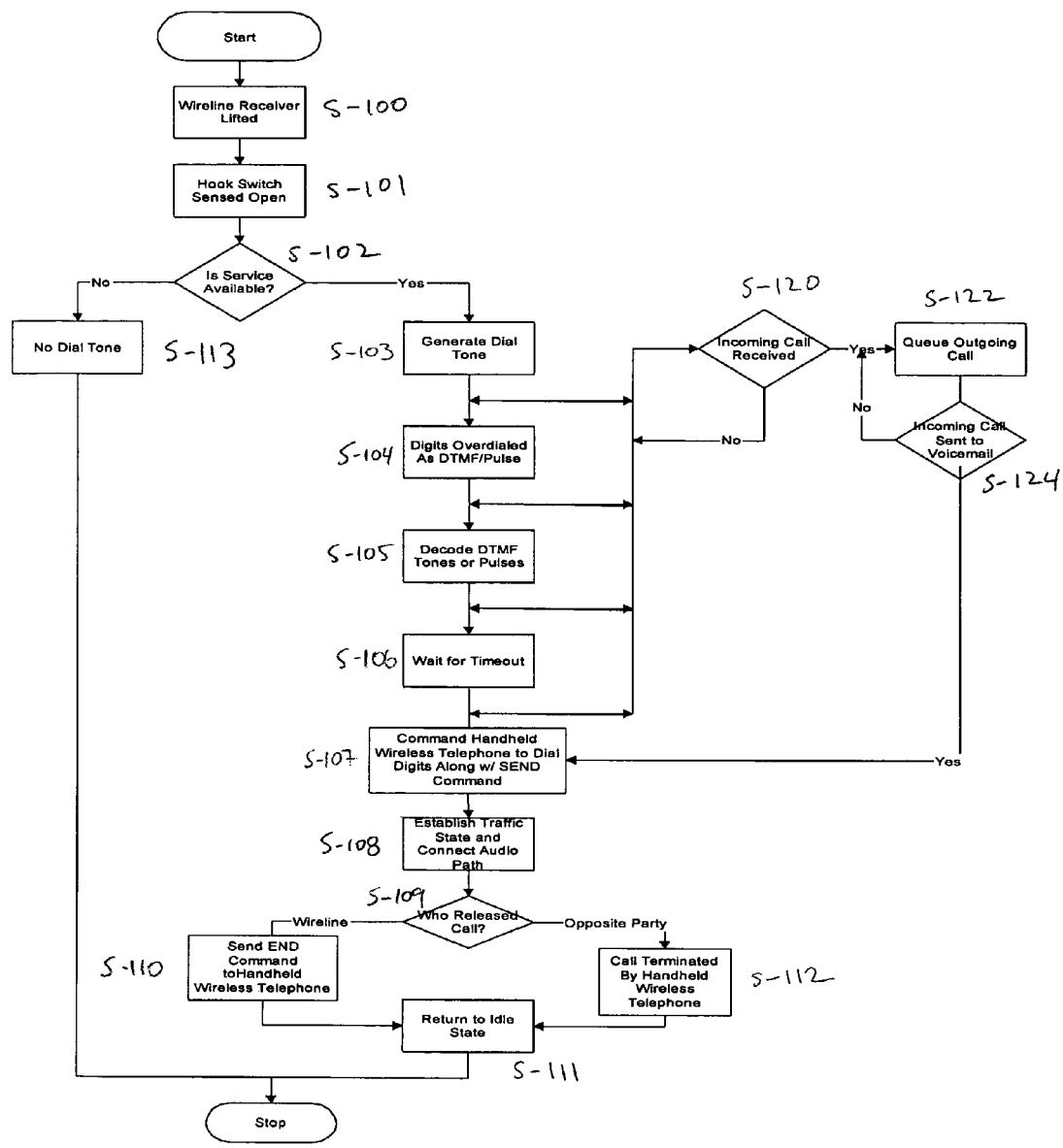
FIG. 12 is a flow chart diagram of operation of the docking station of FIG. 1 during an outbound telephone call.

Referring to the flow chart diagram in FIG. 12, the receiver 113 on one or more of the conventional telephones connected to the docking station 102 via the RJ-11 telephone jack 222 is lifted in step S-100 and the CPU 202 senses that the line is open in step S-101. The CPU 202 evaluates whether telephone service is available (step S-102) as described in FIG. 11. If service is available, then the CPU 202 signals the dial tone generator 216 to generate a dial tone, as illustrated in step S-103. This indicates to the user that the docking station 102 is ready for use.

If an incoming call is received (step S-120) any time after a dial tone is generated (step S-103), but before the handheld wireless telephone 100a is instructed by the CPU 202 to begin dialing a telephone number (step S-107), then the CPU 202 queues the outgoing call (step S-122) until the incoming call is re-directed to voice mail (step S-124). Once the incoming call has been re-directed to voice mail (step S-124), the CPU 202 instructs the handheld wireless telephone 100a to dial the outgoing telephone number (step S-107). The CPU 202 then sends an initiating "SEND" command to the handheld wireless telephone 100a (step S-107). If in step S-120 no incoming call is received, then processing continues as set out below.

In step S-104, the user inputs a telephone number in a conventional manner using a wireline telephone 111, 112 connected to the docking station 102. The docking station 102 receives the DTMF or pulse signals and decodes them using the DTMF decoder 226 in step S-105. To ensure that the user has completed the dialing sequence, the CPU 202 waits for a specified period of time, such as 3 or 4 seconds (step S-106). Once a specified time-out period has elapsed, the CPU 202 signals the handheld wireless telephone 100a via the handset connector 232 and the connecting sleeve 104a to dial the inputted digits. The CPU 202 then sends an initiating "SEND" command to the wireless telephone 100a (step S-107). The telephone call is then connected in step S-108 and the CPU 202 then evaluates whether the call has been ended. When a 911 emergency call is placed (steps not shown), the CPU 202 does not wait for the time out period to elapse. Instead, the call is connected immediately.

In step S-109, the CPU 202 evaluates which party released the call. If the docking station 102 user ends the call, then the CPU 202 in step S-110 sends the "END" command to the handheld wireless telephone 100a, and the docking station 102 returns to the idle state (step S-111). If the opposite party ends the telephone call, then the call will be terminated by the handheld wireless telephone 100a (step S-112) and the docking station 102 returns to an idle state (step S-111).

If in step S-102 the CPU 202 determines that no authorized wireless telephone service is available, then processing stops and no dial tone is transmitted (step S-113) to the connected wireline telephones 111, 112.

Figure 13:
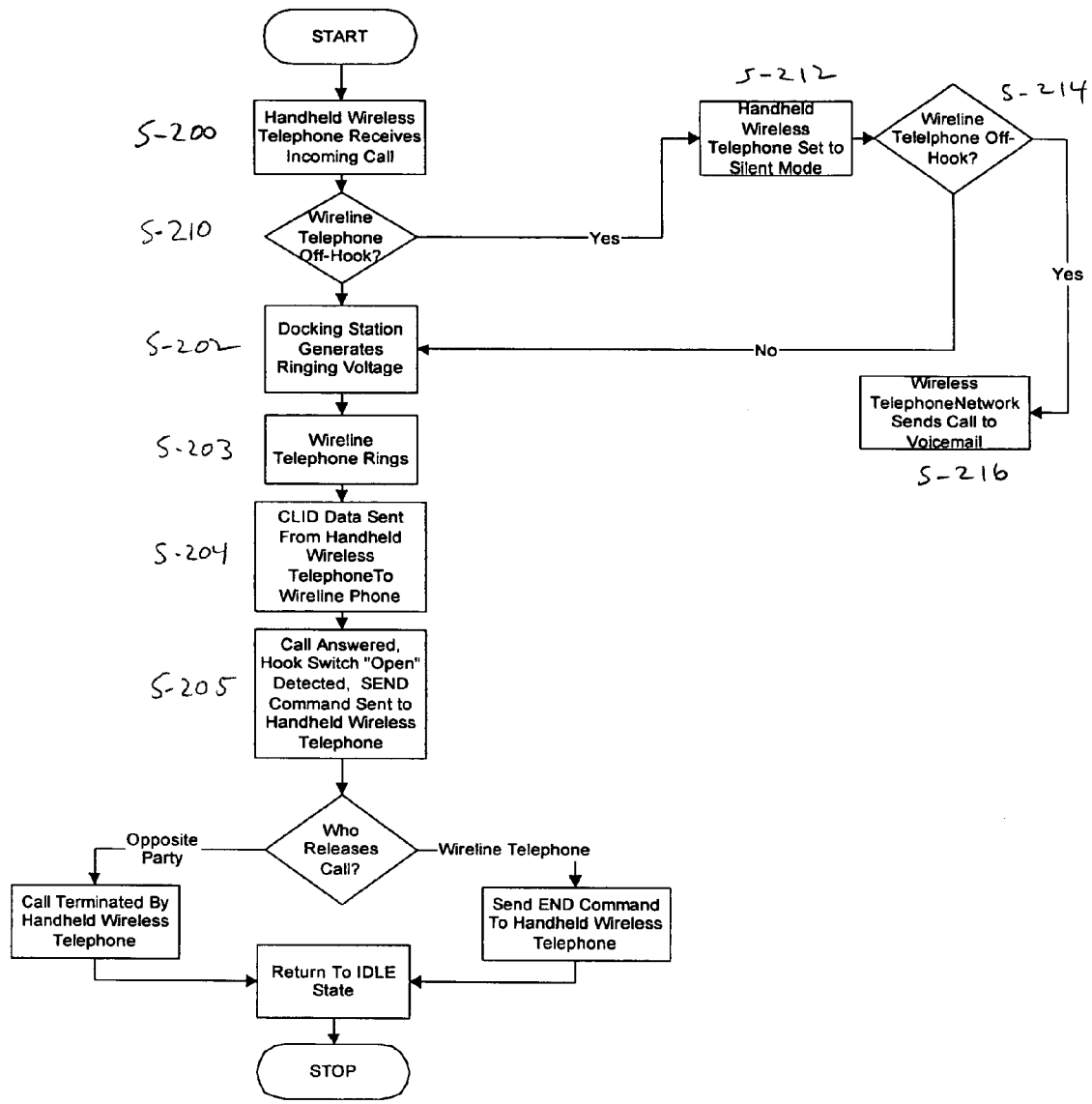
FIG. 13 is a flow chart diagram of operation of the docking station of FIG. 1 during an inbound telephone call.

FIG. 13 details the sequence of steps required to complete an inbound call. In step S-200, the handheld wireless telephone 100a receives a signal from the wireless telephone network. In step S-210, if the receiver 113 of an attached wireline telephone 111, 112 is already lifted but not on a call, the docking station 102 will not send a ringing signal to any of the other attached wireline telephones 111, 112. This situation might occur if the user is in the process of dialing a telephone number on for example wireline telephone 112 and the handheld wireless telephone 100*a* receives an inbound telephone call. In this instance, an "END" command is sent by the CPU 202 to the handheld wireless telephone 100*a* which to puts the handheld wireless telephone's 100*a* ringer in silent mode (step S-212). If the wireline telephone 111, 112 remains off-hook (step S-214), then the incoming telephone call is sent to voice mail (step S-216). The outgoing call then proceeds as described for FIG. 12. If the user hangs up the wireline telephone 112 while the handheld wireless telephone 100*a* is still in termination condition or silent ring state, the wireline telephone 112 rings (step S-202).

For incoming calls, as long as no receiver 113 of an attached wireline telephone 111, 112 is lifted, the CPU 202 signals the ring voltage generator 220 to send a ring signal to an attached wireline telephone 112 or system of wireline telephones 106 (step S-202). The attached wireline telephone 111, 112 rings in step S-203 and caller identification data, if available, is sent from the handheld wireless telephone 100*a* to the conventional telephone in step S-204. When the wireline telephone is answered, the CPU 202 initiates a "SEND" command to the handheld wireless telephone 100*a*, which connects the telephone call (step S-205). The remainder of the call follows the same steps as set out in FIG. 12 from step S-109 onwards.

The docking station 102 may be connected to several handheld wireless telephones 100*a* at a time via an edge type connector (not shown). For example, by connecting two main controller boxes 105 (not shown) multiple handheld wireless telephones 100*a* may be used to send and receive telephone calls using the wireline telephones 111, 112. The first main controller box 105 to be connected to a power source 114 becomes the master. When subsequent main controller boxes 105 are connected to the master main controller box 105, the master main controller box 105 electronically communicates with the additional main controller boxes 105 via the connector and assigns a line number to the added main controller boxes 105 (e.g., 2, 3, 4 for each additional main controller box 105, respectively). Conventional wireline telephones 111, 112 are connected to the master main controller box 105 only. If the power supply to one of the additional main controller boxes 105 is disconnected, voice and data signals will still be transmitted between subsequent main controller boxes 105 and the conventional wireline telephones 111, 112. However, the LEDs of the main controller box 105 without power will not be operational, the battery (not shown) in the added handheld wireless telephone 100*a* connected to the main controller box 105 without power will not be recharged, and the handheld wireless telephone 100*a* itself will be disconnected from the system. Distinctive ring signals are generated by the master main controller box 105 to distinguish incoming telephone calls from different handheld wireless telephones 100*a* connected via the docking station 102.

If an incoming call is received by one of the handheld wireless telephones 100*a* while a call is already in progress, caller identification and call waiting information, if available, are forwarded to the conventional wireline telephones 111, 112. If the second call is not answered, it will be routed to the voicemail associated with the handheld wireless telephone receiving the second call, if available.

Outgoing calls are processed in the same manner as for a single main controller box 105. The handheld wireless telephone 100*a* connected to the master main controller box 105 is automatically used to place the telephone call. Alternatively, a particular handheld wireless telephone may be chosen by pressing the star key "*" on the wireline telephone 111, 112, followed by the number of the handheld wireless telephone. This will cause the CPU 202 to use the corresponding handheld wireless telephone to make the call (steps not shown). For example, if the sequence "*2" is entered, then the second handheld wireless telephone will be used for the outgoing call.

The docking station 102 may be configured to simulate any of the features available on wireline telephone networks such as multi-party conferencing, call hold, call mute, call forwarding, fax notification, net mail notification voice mail, one touch voice mail retrieval, caller identification, short message service (SMS, which must be viewed directly on the handheld wireless telephone 100*a*) and call waiting. For connected wireline telephones with displays (not shown), such as the Vista 350 telephone manufactured by Nortel Networks Corporation of Brampton, Ontario, the docking station 102 flows through relevant data received from the handheld wireless telephone 100*a* to the connected wireline telephones 111, 112.

Figure 14:
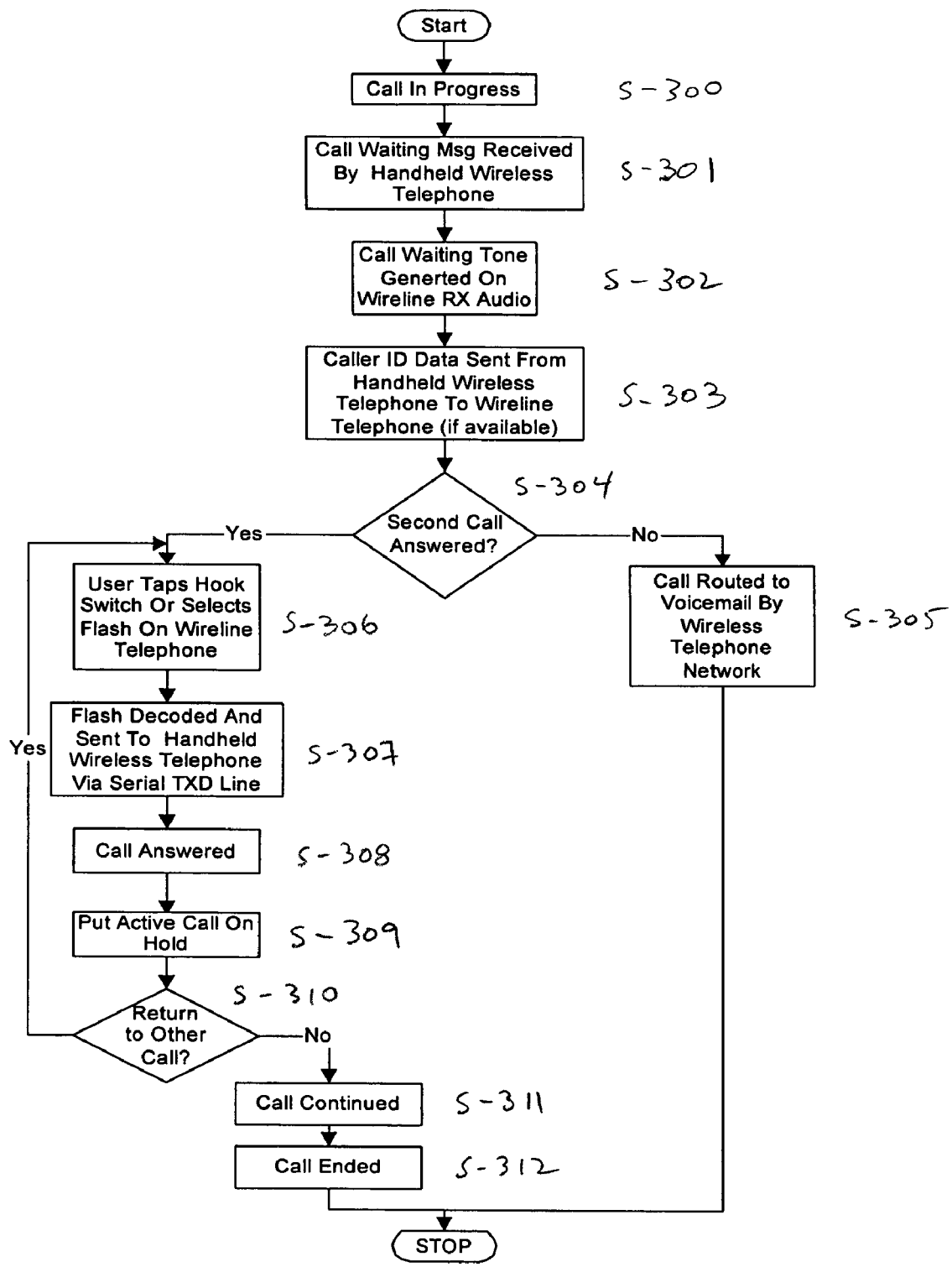
FIG. 14 is a flow chart diagram of a call waiting function of the docking station of FIG. 1.

For example, FIG. 14 illustrates how the call waiting function of the docking station 102 is achieved. Step S-300 begins when a call is already in progress. In step S-301, a call waiting signal is received by the handheld wireless telephone 100*a*, which is transmitted to the CPU 202. The CPU 202 signals an attached conventional telephone 112 or system of telephones 106 in step S-302. Caller ID data may also be sent (step S-303). In step S-304, the wireless telephone network evaluates whether the second call is answered. If the second call is not answered, the call is routed to voicemail, if available, using the wireless telephone network (step S-305).

The second call is answered by the user tapping the telephone's hook switch (not shown) or selecting the flash key (not shown) on the wireline telephone (step S-306). The hook switch or flash signal is decoded and sent to the handheld wireless telephone 100*a* via the transmit data connection 238 (step S-307), and the second call is answered (step S-308), while the first call is put on hold (step S-309). This process may be repeated to switch between the first and second calls following steps S-306 through to S-310. When one of the calls is abandoned (step S-310), the other call may be continued (step S-311). The termination of the abandoned call is achieved in the same manner as set out in FIG. 12 from step S-109 through to step S-111. The continued call (step S-311) is similarly ended (step S-312).

Figure 16:
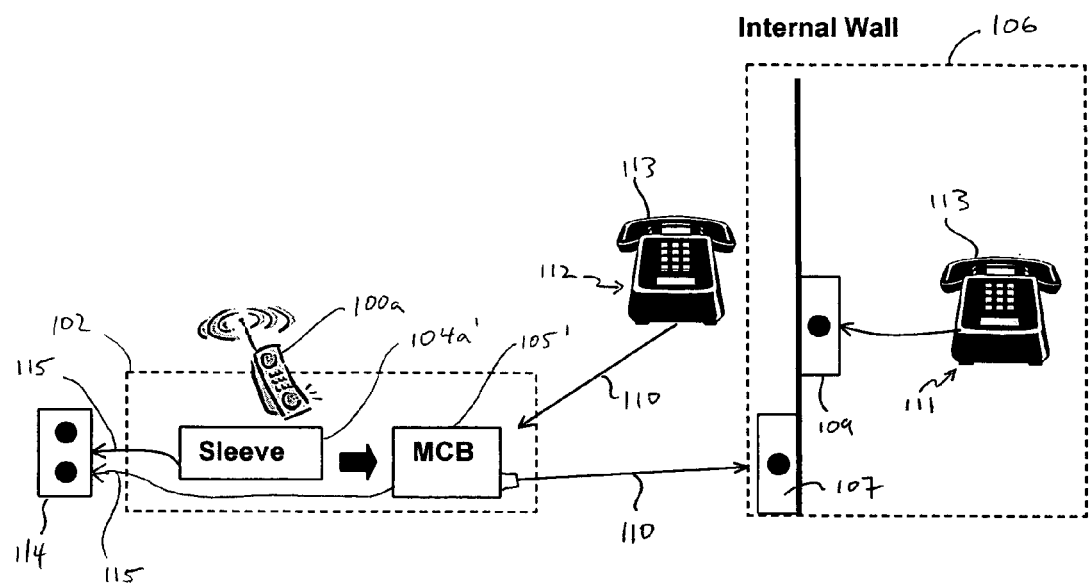
FIG. 16 is a diagram of a typical installation of a docking station according to a second embodiment of the invention.

Referring to FIG. 16, in a second embodiment of the invention, a wireless telephone 100*a* is removably connected to a main controller box 105' via a releasable connecting module, for instance a connecting sleeve 104*a*' (all reference numerals that designate elements of the second embodiment are marked with the prime symbol). The connecting sleeve 104*a*' and the main controller box 105' comprise the docking station 102'. The wireless telephone 100*a* is a handheld wireless telephone 100*a* such as a cellular telephone. As with the first embodiment, the handheld wireless telephone 100*a* may be easily disengaged for independent use as a mobile telephone. The docking station 102' interacts directly with the handheld wireless telephone 10*a* and replicates functions available on the handheld wireless telephone 100*a*, therefore existing wireless telephone networks may readily be accessed by the docking station 102'. The docking station 102' may be configured to access at least one wireless telephone network (not shown) including digital PCS, AMPS, CDMA, GSM, TDMA and iDEN™ networks. A serial connector such as a RS-232 DB9 serial connector 709*a*' (see FIG. 26) may also be added to the sleeve 104*a*'. The serial connector 709*a*' enables a computer (not shown), connected to the serial connector 709*a*', to transmit and receive data over a wireless telephone network.

The design of the connecting sleeve 104*a*' is modified so that various makes and models of handheld wireless telephone may be used with the docking station 102'. For example, FIGS. 28, 29, 30, 31 and 32 show two different makes and models of handheld wireless telephone 100*a*, 100*b* situated in specially configured connecting sleeves 104*a*', 104*b*'. Note that the suffix "a" added to the reference numerals indicates that connecting sleeve 104*a*' is configured for use with wireless telephone 100*a*. Similarly, the suffix "b" indicates that connecting sleeve 104*b*' is configured for use with handheld wireless telephone 10*b*. For clarity, the reference numerals for the elements comprising the different connecting sleeves 104*a*', 104*b*' are labeled with an "a" or a "b" in the same manner. The specially configured connecting sleeves are described in greater detail below.

The docking station 102' powers an existing wireline telephone system 106 and/or standalone wireline telephone 112. The existing wireline telephone system 106 may be connected to the docking station 102' using a standard telephone jack 107 and a telephone cable wire 110. The telephone cable wire 110 is connected at one end to the telephone jack 107 and at the other to at least one of two RJ-11 jacks 401', 402' of the docking station 102' (see FIG. 20). The RJ-11 jacks 401', 402' are connected to each other in parallel. The wireline telephone 112 may be connected directly to one of the two RJ-11 jacks 401', 402'. As with the first embodiment, although a wireline telephone 111, 112 is illustrated, other types of wireline telephone will be suitable for use with the docking station 102'.

The main controller box 105' is powered by electricity supplied to it via a power input receptacle 400' (see FIG. 20). Each connecting sleeve 104*a*' is similarly connected to a conventional 120 volt AC power source 114 via a power input receptacle 836*a*' (see FIG. 26). Electricity is transmitted from the AC power source to the main controller box 105' and connecting sleeve 104*a*' via standard electrical connecting cables 115 each comprising an AC to DC transformer (not shown) for supplying DC electricity to each of the main controller box 105' and connecting sleeve 104*a*' (see FIG. 27).

Once a power source is connected to the respective power input receptacles 400', 836*a*', such as the AC power source 114, the main controller box 105' and connecting sleeve 104*a*' automatically turn on. The docking station 102' may also be equipped with an internal and/or external rechargeable back-up battery (not shown) that supplies electricity to the docking station 102' if the AC power source 114 is interrupted. If a back-up battery pack is used, then circuitry for a low battery alert may also be implemented. Of course, other means of power supply would be evident to those skilled in the art.

The docking station 102' permits the replacement of conventional wireline telephone service with wireless telephone service, while maintaining the use of wireline telephones 112 or systems of wireline telephones 106. Users therefore require just one telephone service, and therefore one telephone number, for both mobile telephone service and telephone service previously provided via a landline-based telephone network. Users are not required to carry or find the wireless telephone, and more than one user may participate in the telephone conversation through the use of the existing wireline infrastructure, such as the system of wireline telephones 106.

Figure 28:
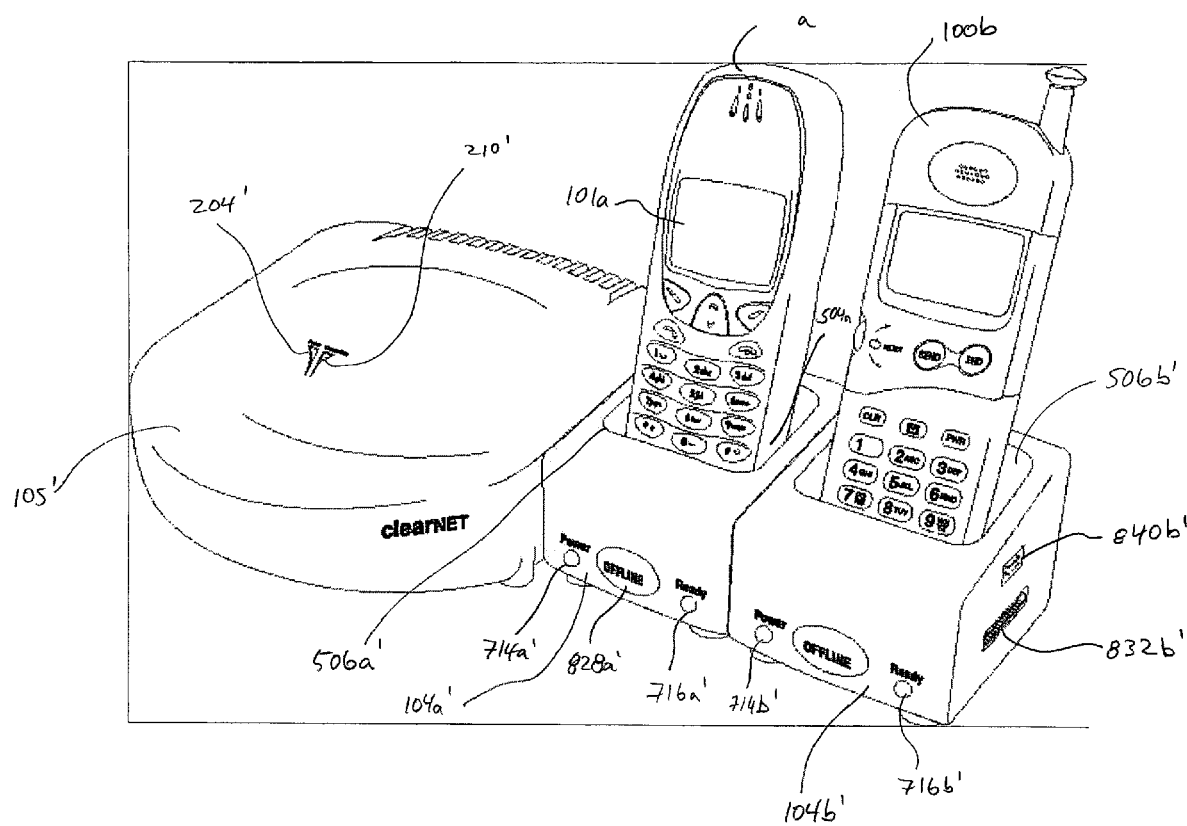
FIG. 28 is a diagram of a docking station according to a second embodiment of the invention, showing the main controller box with two connecting sleeves and a different make and model of handheld wireless telephone in each of the respective sleeves.

The main controller box 105' is configured to accept more than one connecting sleeve 104*a*' and handheld wireless telephone 100*a* combination at a time (see FIG. 28). This configuration permits multiple users of handheld wireless telephones 100*a* to take advantage of one docking station 102' installation to make and receive telephone calls using different handheld wireless telephones connected to the main controller box 105'. If each connected handheld wireless telephone 100*a* is configured to access a different wireless telephone network, then a user may access all networks using just one docking station 102'.

Figure 15:
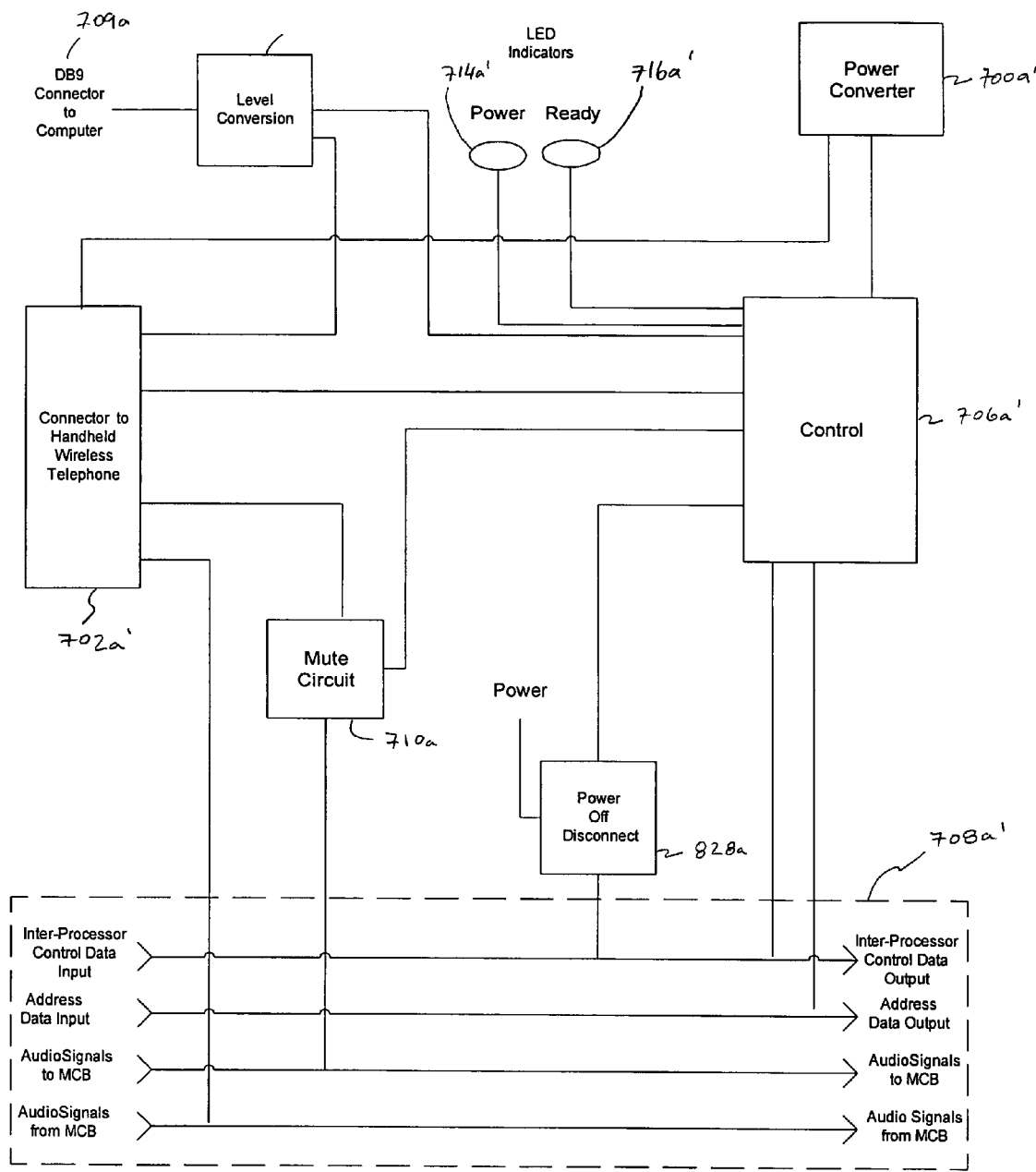
FIG. 15 is a block diagram of a connecting sleeve according to a second embodiment of the invention.

Referring to FIG. 15, a DC to DC regulated power supply 700*a*' regulates the DC power transmitted by the electrical connecting cable 115 to match the power requirements of all components of the connecting sleeve 104*a*', and the recharging requirements of a connected handheld wireless telephone 100*a*. DC power is provided to the handheld wireless telephone 100*a* via a first data bus connector, such as connector 702*a*', to charge a rechargeable battery in the handheld wireless telephone 100*a*. The handheld wireless telephone 100*a* is recharged as it is seated in the connecting sleeve 104*a*'. Recharging may be accomplished while the docking station 102' transmits and receives telephone calls and when the docking station 102' is not in use. In either case, the handheld wireless telephone 100*a* battery, not shown, is charged in the same timeframe that a conventional battery charger would take to charge a battery in a standalone wireless telephone. The connecting sleeve 104*a*' converts input voltage to the appropriate DC voltage required by the handheld wireless telephone 100*a*.

A user may take a particular handheld wireless telephone, for example handheld wireless telephone 100*a*, offline from the wireline telephone system 106 or standalone wireline telephone 112, by pushing the offline button 828*a*'. While the handheld wireless telephone is offline, a multi-colored ready LED 716*a*' (see FIG. 24) on the sleeve 104*a*' will illuminate red. The handheld wireless telephone 100*a* while offline will continue to function as a stand-alone unit within the wireless telephone network, but may not be accessed using a wireline telephone 111, 112 connected to the docking station 102'.

Within the connecting sleeve 104*a*', a first translator, for instance a control 706*a*', which includes a CPU and flash EPROM, communicates electronically with circuitry within the main controller box 105' (see FIG. 17) via a second data bus connector 830*a*' (see FIG. 24), which is connected to a data bus 708*a*'. The electronic communication signals are translated by the control 706*a*' for a particular make and model of handheld wireless telephone 100*a*. The control 706*a*' translates commands specific to a particular make and model of handheld wireless telephone 100*a* into a common set of commands that permit the handheld wireless telephone 100*a* to communicate with the main controller box 105'. Connecting sleeves 104*a*', 104*b*' thus have controls which are configured differently to translate signals for the particular handheld wireless telephone 100*a*, 100*b* used in conjunction with the corresponding connecting sleeve 104*a*', 104*b*'. The configuration of the main controller box 105' is the same regardless of the type of handheld wireless telephone 100*a*, 100*b* used. Maintenance, repair and upgrading of the control 706*a*' are done by reflashing the EPROM within the control 706*a*' via the data bus connector 830*a*'.

A level conversion module 712*a*', connected to the control 706*a*', converts logic levels used by the control 706*a*' to levels used by a serial connection 709*a*'. For data communication using a wireless telephone network, the serial connection 709*a*' may be used to connect the docking station 102' to a computer. The control 706a' functions as a buffer for data when a serial connection 709a' is used to connect the sleeve 104a' to a computer.

The control 706a' is connected to a sleeve mute circuit 710a' which disconnects the handheld wireless telephone 100a from the data bus 708a'. This is done when more than one connecting sleeve 104a' is connected to the main controller box 105'. By muting the audio signal, any signal produced by the handheld wireless telephone 100a will not interfere when, for example, handheld wireless telephone 100b is already active sending and receiving signals to and from the main controller box 105'.

Using data bus connector 830a, the data bus 708a' transmits power, audio signals, address data and inter-processor control data (used by the control 706a' and control 750', see FIG. 17) between the components of the connecting sleeve 104a' and the main controller box 105'. As described in greater detail below, if more than one connecting sleeve 104a', 104b' is connected to the main controller box 105', then the data bus 708a' acts as a conduit for data sent between an additional connecting sleeve 104b' and the main controller box 105'.

Table 1, below, provides a summary of the audio and visual notifications that are provided to the user for various scenarios. These notifications are described in detail in the description that follows the table.

TABLE 1

| Scenario | Audible Notification Sent to Wireline Telephone(s) 111, 112 by Docking Station 102' | Docking Station 102' Visual Indicator |
| --- | --- | --- |
| No Power Supplied to main controller box 105' | No dial tone | None (main controller box 105') |
| No Power Supplied to sleeve 104a' | No dial tone | None (sleeve 104a') |
| Power Connected to main controller box 105' | N/A | Power LED 204' illuminates in a green colour (main controller box 105') |
| Power Connected to sleeve 104a' | N/A | Power LED 714a' illuminates in a green colour (sleeve 104a') |
| Voltage detected in wireline telephones | N/A | Connection LED 210' flashes red (main controller box 105') |
| No voltage detected in wireline telephones, and main controller box 105' is connected properly | Dial tone | Connection LED 210' illuminates in a green colour (main controller box 105') |
| Handheld Wireless Telephone 100a not inserted in sleeve 104a' | No dial tone | Ready LED 716a' illuminates in a red colour (sleeve 104a') |
| Handheld Wireless Telephone 100a inserted in sleeve 104a' and powered OFF | No dial tone | Ready LED 716a' illuminates in a red colour (sleeve 104a') |
| Handheld Wireless Telephone 100a inserted in sleeve 104a' and there is no wireless telephone service available or no authorized wireless telephone service available | No dial tone | Ready LED 716a' illuminates in a red colour (sleeve 104a') |
| Handheld Wireless Telephone 100a correctly inserted in sleeve 104a' and powered ON; and power supplied to sleeve 104a' | Dial tone | Ready LED 716a' illuminates in a green colour (sleeve 104a') |
| Handheld Wireless Telephone 100a inserted in sleeve 104a' and call is in progress | N/A | Ready LED 716a' flashes in a green colour (sleeve 104a') |
| Sleeve 104a' offline | No dial tone | Ready LED 716a' illuminates in a red colour (sleeve 104a') |

A multi-colored first power status LED 714a' and a ready LED 716a' are connected to the control 706a'. When power is supplied to the connecting sleeve 104a', power LED 714a' turns green. If either the handheld wireless telephone 100a is not inserted into the connecting sleeve 104a' properly; or the handheld wireless telephone 100a is properly inserted but is not turned on; or the handheld wireless telephone 100a is properly inserted and turned on but no authorized wireless telephone service is available, then the ready LED 716a' turns red to warn that there is a problem. If none of these scenarios arises then the ready LED 716a' turns green, indicating that the docking station 102' is ready to translate communication signals between the handheld wireless telephone 104a and the wireline telephone 111, 112. If a telephone call is in progress then the ready LED 716a' flashes green.

Figure 17:
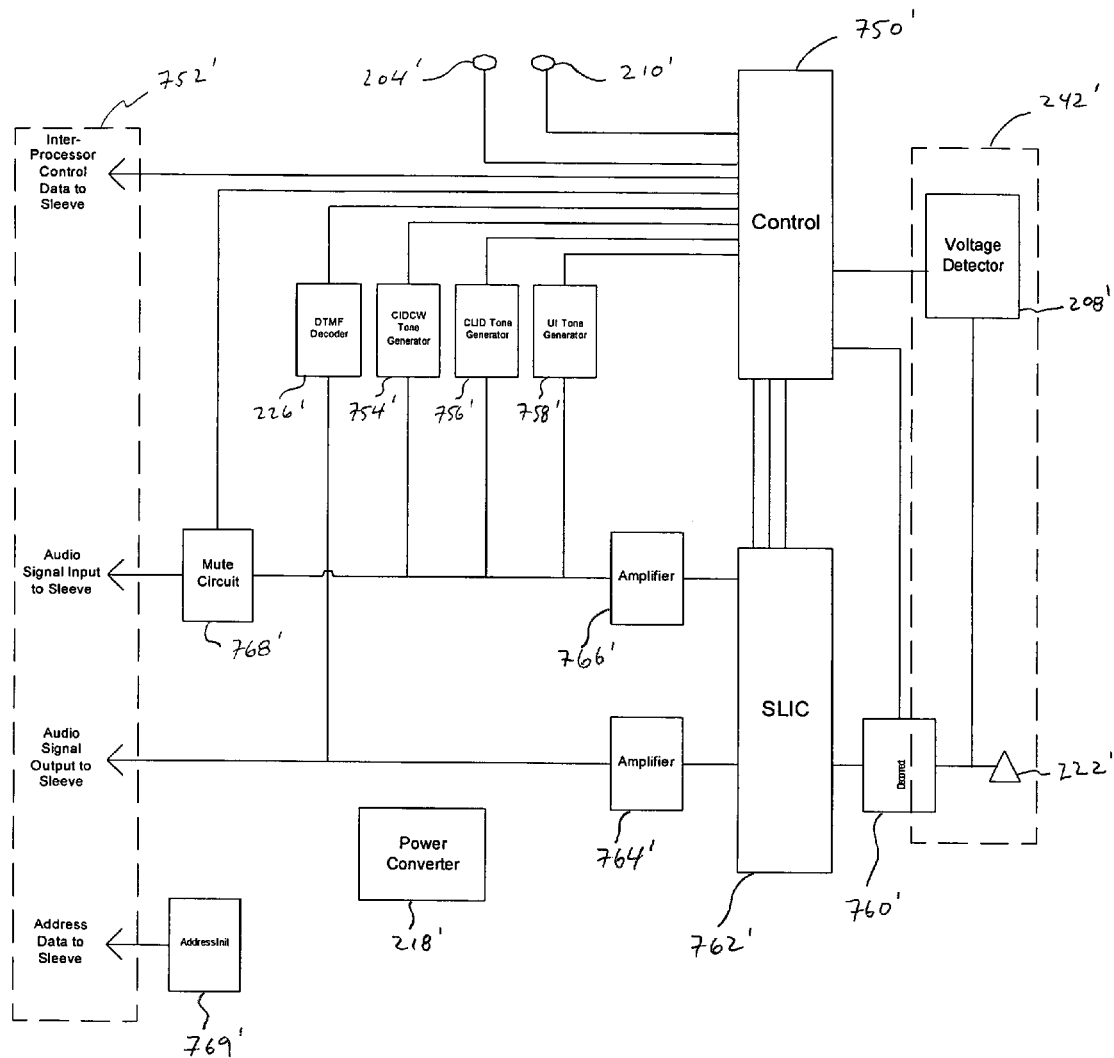
FIG. 17 is a block diagram of the main controller box of FIG. 16.

Referring to FIG. 17, a control 750' comprises a CPU, a flash EPROM and a clock (not shown) which all operate in substantially the same manner as described for the first embodiment. The control 750' provides instructions which provide for the operational features described herein. The instructions may be encrypted to prevent reverse engineering of the software encoded in the control 750'. The control 750' is connected to a data bus connector 752' which corresponds to the data bus connector 830a' of the connecting sleeve 104a'. As described above for the data bus 708a', power, audio signals, address data and inter-processor (i.e., between control 750' and control 706a') control data are transmitted and received via this connection between the control 750' and one or more handheld wireless telephones 100a, 100b.

The control 750' translates communication signals between the main controller box 105' and the wireline telephone 112 and/or wireline telephone system 106. Thus the control 706a' in the connecting sleeve 104a' translates communication signals between the handheld wireless telephone 100a and the main controller box 105' for a particular make and model of handheld wireless telephone 100a, and the control 750' translates communication signals between the main controller box 105' and the wireline telephone 112 and/or wireline telephone system 106. In an alternative embodiment, if only one make and model of handheld wireless telephone 100a is used in conjunction with the docking station 102', then the control 750' may be configured to translate communication signals between the handheld wireless telephone 100a and the wireline telephone 112 and/or wireline telephone system 106. In this configuration, the control 706a' in the connecting sleeve 104a' does not perform a translation function.

The docking station 102' connects to a wireline telephone system 106 and/or a standalone wireline telephone 112 via a standard connector 222', such as a female RJ-11 connector. Other connectors 222' may be used as will be evident to those skilled in the art. The docking station 102' may also be configured with a second RJ-11 connector so that a standalone wireline telephone 112 may access the docking station 102 if a conventional telephone system 106 is connected to the first RJ-11 connector. Alternatively, a splitter, not shown, may be connected between RJ-11 connector 222', telephones 112 and telephone system 106. Many alternative configurations would be evident to a person skilled in the art depending upon the requirements of a particular application, such as number of telephones 111, 112, the load of each telephone 111, 112, and physical access to connections to the wireline telephone 112 and the telephone system 106.

As in the first embodiment, a direct connection is provided between the control 750' and the RJ-11 connector 222' so that voltage in the wireline telephone system 106 may be detected. A voltage circuit detector, for instance a line voltage detector 208', is also connected to the RJ-11 connector 222' and the control 750' forming a high impedance detection circuit 242', which detects the presence of a landline telephone network signal in the wireline telephone system 106. The voltage detector 208' detects voltage by sampling the voltage on the wireline telephone system 106. The voltage detector 208' is configured so that voltage generated by the wireline telephones 111, 112 is ignored. A voltage sense level of 1±0.5 volts is preferred. Input impedance to the voltage detector 208' is preferably greater than 2 Mega ohms, a level sufficient to not affect on-hook/off-hook detection of the connected telephones 111, 112.

If voltage is detected by the voltage detector 208', then a disconnect 760' connected to the control 750' and the RJ-11 connector 222', isolates the docking station 102' from the landline telephone network signal by electronically disconnecting the docking station 102' from the wireline telephone system 106. Both ring and tip leads (not shown) of the wireline telephone system 106 are disconnected. The disconnect 760' preferably supports a voltage of 300 volts, has a current carrying capacity of 1 amp, has an impedance of less than 10 ohms and uses 12 volt control at less than 20 milli-amps. It is also polarity insensitive when connected, and has a negligible effect on telephone connections.

The disconnect 760' is also connected to a subscriber line interface circuit ("SLIC") 762'. The SLIC 762' interacts with the control 750', to which it is connected, and performs the following functions: power feed, hook state supervision, ring generation and audio separation. In conjunction with the other components of the main controller box 105', the SLIC simulates the manner in which communication signals are processed by a landline telephone network to make it appear to users of the wireline telephone 111, 112 that the landline telephone 111, 112 is connected to a landline telephone network. As a result, users may employ a wireline telephone 111, 112 to access a wireless telephone network in the same manner that a landline telephone network is accessed.

The power feed function converts electricity supplied via a DC to DC regulated power supply 218' to approximately 24 volts with a preferred current of 20 to 40 milli-amps. The hook state supervision function monitors direct current flow in the wireline telephone 112 and wireline telephone system 106 to determine whether a connected wireline telephone receiver 113 has been lifted.

If an incoming telephone call is detected, then the ring generation function generates and sends a ringing signal to the connected telephones 111, 112. A short ring preferably has a duration of between 0.4 and 0.5 seconds and a long ring has a duration of between 0.8 and 1.5 seconds, with a separation between rings of between 0.2 and 0.65 seconds.

If additional sleeves 104a' are connected to the main controller box 105' (described in greater detail below), different rings may be used to distinguish incoming telephone calls received by different handheld wireless telephones 100a, 10b. For example, the docking station 102' could be configured so that two long rings indicate a call being received by a second handheld wireless telephone 100b. If only one connecting sleeve 104a' is used, a long first ring followed by two short rings may be used to indicate that a long distance call is being received. Distinctive ring functionality may only be implemented if supported by the connected handheld wireless telephone 100a. The docking station 102' may thus be configured so that different ring combinations provide additional information about the telephone calls received.

The audio separation function of the SLIC 762' separates all audio signals into incoming and outgoing signals that are channeled to the talk path and listen path of the connected handheld wireless telephone 100a.

Connected to the SLIC 762' are an outbound amplifier 764' and an inbound amplifier 766'. The inbound amplifier 766' converts the level and impedance of the audio signal supplied by the handheld wireless telephone 100a, via the data bus connector 752', to the level and impedance required by the SLIC 762'. Similarly, the outbound amplifier 764' converts the level and impedance of the audio signal supplied by the SLIC 762', via the data bus connector 752', to the level and impedance required by the handheld wireless telephone 100a.

A mute circuit 768', connected to the data bus connector 752' and the inbound amplifier 766', turns off the incoming audio signal from the handheld wireless telephone 100a when a subscriber alerting ("SAS") tone for call waiting and caller identification on call waiting ("CIDCW") is received. Muting preferably lowers the audio signal to less than −50 dBm.

An address module 769' connected to data bus connector 752' permits the main controller box 105' to distinguish additional connecting sleeves, such as connecting sleeves 100a, 100b, from one another.

The DC to DC regulated power supply 218' regulates the DC power transmitted by the electrical connecting cable 115 to match the power requirements of the components of the main controller box 105'. The regulated power supply 218' also regulates power supplied by the main controller box 105' to the connected conventional wireline telephone system 106 and standalone wireline telephone 112.

The control 750' is connected to a dual tone multifrequency ("DTMF") decoder 226', a CIDCW tone generator 754', a caller identification ("CLID") tone generator 756' and a user interface ("UI") tone generator 758'. The DTMF decoder 226', which is connected to the audio signal output channel in the data bus connector 752', receives tones generated by a wireline telephone 111, 112 and CIDCW transactions and processes the tones in a manner as is well known to one skilled in the art.

The CIDCW tone generator 754', CLID tone generator 756' and UI tone generator 758' are all connected to the audio signal input channel of the data bus connector 752'. The CIDCW tone generator 754' generates a customer premise equipment ("CPE") alerting signal ("CAS"). This alerts a wireline telephone 111, 112 that is in use that caller identification on call waiting is available. If the wireline telephone 111, 112 is configured to accept such information, it is sent to the wireline telephone 111, 112. When an incoming call is received by the docking station 102', the CLID tone generator 756' generates the required frequencies to show the incoming number and related information to a telephone 111, 112 equipped with an appropriate display (not shown).

The UI tone generator 758' sends call progress tones to a connected telephone 111, 112 that is in use. Tones generated include: dial tone, message waiting, busy, ringback, congestion, reorder, high tone, receiver off hook, call waiting, call waiting second number and call waiting long distance. As summarized in Table 1 above, no dial tone is generated by the UI tone generator 758' in the following scenarios: the handheld wireless telephone 100a is not properly inserted in the sleeve 104a'; the handheld wireless telephone 100a is inserted into the sleeve 104a' and turned off; and the handheld wireless telephone 100a is inserted into the sleeve 104a' but there is no authorized wireless telephone service available. If no power is supplied to either the main controller box 105' or the connecting sleeve 104a' then no tone is produced by the UI tone generator 758'. A dial tone is generated by the UI tone generator 758' as long as the following conditions are met: no voltage is detected by the voltage detector 208' in the connected wireline telephone system 106; the main controller box 105' is connected properly to the wireline telephone system 106 and/or the standalone wireline telephone 212; the wireless telephone is turned on; an authorized wireless telephone service is available; and the handheld wireless telephone 100a is properly inserted into the sleeve 104a'.

The docking station 102' may be configured to restrict incoming communication signals so that it operates only in conjunction with one or more predetermined wireless telephone network providers. When the docking station 102' is configured in this manner, if the control 750' receives a code unique to the wireless telephone network provider, such as a system identification number ("SID"), from the handheld wireless telephone 100a, it checks this number against a list of SID numbers preprogrammed in the EPROM. If the number does not match, then the docking station 102' does not generate a dial tone, the docking station 102' may not be used to send and receive telephone calls, and the ready LED 716a' on the connecting sleeve 104a' illuminates red.

A multi-colored second power status LED 204' and a multi-colored connection status LED 210' are connected to the control 750'. Power status LED 204' indicates whether electricity is provided to the main controller box 105'. Connection status LED 210' indicates whether or not the main controller box 105' has successfully made a connection with the wireline telephone system 106 or standalone wireline telephone 112. As summarized in Table 1 above, if the main controller box 105' is receiving power then the power status LED 204' turns green. The power status LED 204' is otherwise darkened. If voltage is detected in the wireline telephone system 106 then the connection status LED 210' flashes red. If no voltage is detected then the connection status LED 210' turns green.

Referring to FIGS. 18 and 19, the two status indicator LEDs 204' and 210' are grouped on the front surface of the main controller box 105'.

Referring to FIG. 20, the rear side of the main controller box 105' is provided with two female RJ-11 telephone connectors 401' and 402'. The RJ-11 connectors 401', 402' may be used to connect the docking station 102' to one or more wireline telephone systems 106 and/or standalone conventional telephones 112, as previously described.

Referring to FIGS. 20, 22, 23, 24, 25 and 26, one side of the main controller box 105' has a female data bus connector 752', which receives a corresponding male connector 830a' located on the side of the connecting sleeve 104a'. Data is transmitted between the main controller box 105' and connecting sleeve 104a' via the connectors 752', 830a'. Maintenance, repair and upgrading of the control 750' of the main controller box 105' and the control 706a' of the connecting sleeve 104a' are done by reflashing the EPROM within the respective controls 750', 706a', via the data bus connectors 752', 830a'.

In the second embodiment, data bus connectors 752', 830a' are 20 pin connectors. Table 2, below, details the pin configuration for the data bus connectors 752' and 830a' (the configuration is the same for each connector). Similarly, Table 3 details the pin connections between data bus connector 832a' and a corresponding connector on an additional connecting sleeve 104b'. The pins listed in Table 3 perform the same functions as the corresponding pins described in Table 2. Note that the address line pins 9 to 13 of data bus connector 832a' each connect to different address line pins in the corresponding data bus connector on the connecting sleeve 104b'. When more than one connecting sleeve 104a' is connected to the main controller box 105', this arrangement of pins permits each connecting sleeve to be distinguished from the other. The pin connections for additional sleeves, for example 104c', are similar to those described in Table 3.

TABLE 2

| Pin | Description |
|---|---|
| 1 | 5 volt power from main controller box 105' to first connecting sleeve 104a', not passed to additional connecting sleeve 104b' |
| 2 | 12 volt raw power from main controller box 105' to first connecting sleeve 104a', not passed to additional connecting sleeve 104b' |
| 3 | 12 volt return from the connecting sleeve 104a' regulators 700a' |
| 4 | Not used |
| 5 | 2.5 volt reference (used to offset the audio signal) |
| 6 | Not used |
| 7 | Audio to handheld wireless telephone 100a (or additional handheld wireless telephone 100b, for example) |
| 8 | Audio from handheld wireless telephone 100a (or additional handheld wireless telephone 100b, for example) |
| 9 | Address line used to distinguish connecting sleeves 100a, 100b when serially connected |
| 10 | Address line used to distinguish connecting sleeves 100a, 100b when serially connected |
| 11 | Address line used to distinguish connecting sleeves 100a, 100b when serially connected |
| 12 | Address line used to distinguish connecting sleeves 100a, 100b when serially connected |
| 13 | Address line used to distinguish connecting sleeves 100a, 100b when serially connected |
| 14 | System ground |
| 15 | Not used |
| 16 | 5 volt power from the main controller box 105' used for powering data bus switches |
| 17 | Data to the connecting sleeve 104a (used in inter-processor communication between connecting sleeve control 706a' and main controller box control 750') |
| 18 | Inter-processor data initialization (used in inter-processor communication between connecting sleeve control 706a' and main controller box control 750') |
| 19 | Data from the connecting sleeve 104a (used in inter-processor communication between connecting sleeve control 706a' and main controller box control 750') |
| 20 | Inter-processor data clock (used in inter-processor communication between connecting sleeve control 706a' and main controller box control 750') |

TABLE 3

| Pin of Data Bus Connector 832a' | Connected to Pin of Corresponding Data Bus Connector in Additional Connecting Sleeve 104b' |
|---|---|
| 1 | Not Connected |
| 2 | Not Connected |
| 3 | Not Connected |
| 4 | Not Connected |
| 5 | Input Pin 5 |
| 6 | Not Connected |
| 7 | Input Pin 7 |
| 8 | Input Pin 8 |
| 9 | Input Pin 10 |
| 10 | Input Pin 11 |
| 11 | Input Pin 12 |
| 12 | Input Pin 13 |
| 13 | Ground (0 volts) |
| 14 | Input Pin 14 |
| 15 | Not Connected |
| 16 | Input Pin 16 |
| 17 | Input Pin 17 |
| 18 | Input Pin 18 |
| 19 | Input Pin 19 |
| 20 | Input Pin 20 |

An automatic locking device for joining a connecting sleeve 104a' to the main controller box 105', comprises a female connecting clip 778' and a corresponding male connecting clip 834a'. The female connecting clip 778' may be located in the side of the main controller box 105' and receives the corresponding male connecting clip 834a' located in the side of the connecting sleeve 104a'. Together the clips 778', 834a' form a snap fit and may be pulled apart by hand. When connected, the clips 778', 834a' prevent the main controller box 105' and connecting sleeve 104a' from coming apart, for example, when accidentally knocked or bumped. This helps to maintain the physical connection between data bus connectors 752', 830a'. Other means of connecting the main controller box 105' to the connecting sleeve 104a' may be used as would be evident to those skilled in the art.

The connecting sleeve 104a' has on its front the power status LED 714a' and the ready status LED 716a'. The offline button 828a' is also located on the front of the connecting sleeve 104a'. The back of the connecting sleeve 104a' has the serial connector 709a' and an electrical power input receptacle 836a'. The power input receptacle 836a' may be connected to an AC power source 114, using a standard electrical connecting cable 115, as described above.

A telephone specific connector 702a' interfaces with a corresponding data bus connector on a handheld wireless telephone 100a. The configuration of the telephone specific connectors 702a', 702b' varies for each make and model of handheld wireless telephone 100a, 100b (see FIGS. 30 and 32). In general, the telephone specific connector 702a' comprises four types of connections: a power connection, a handset control connection, a data control connection and an audio connection. The power connection is used to provide power to the handheld wireless telephone 100a and to charge its battery. The handset control connection is used to control the functions of the handheld wireless telephone 100a, for example the "SEND" and "END" functions, and to set the handheld wireless telephone 100a to a particular mode of operation. The handset control connection may be multiplexed with the data control connection or it may be separate. The data control connection is used when the connecting sleeve 104a' is connected to a computer via serial connector 709a'. The audio connection carries the audio signal to and from the handheld wireless telephone 100a.

The different connections are each carried via one or more pins within the telephone specific connector 702a'. By way of example, the pin configuration of a telephone specific connector 702a' would be as provided in Table 4, below.

TABLE 4

| Pin | Description |
|---|---|
| 1 | Power of 5.5 volts DC at 1 amp to handheld wireless telephone 100a |
| 2 | Not used |
| 3 | Not used |
| 4 | Data from handheld wireless telephone 100a used for data control and handset control (RS232 RD) |
| 5 | Data from handheld wireless telephone 100a used for data control (RS232 CD) |
| 6 | Data to handheld wireless telephone 100a used for data control and handset control (RS232 TD) |
| 7 | Data from handheld wireless telephone 100a used for data control (RS232 RTS) |
| 8 | Data from handheld wireless telephone 100a used for data control (RS232 DSR) |
| 9 | Data from handheld wireless telephone 100a used for data control (RS232 DTR) and connected to pin 11 |
| 10 | Data from handheld wireless telephone 100a used for data control (RS232 RI) |
| 11 | Data from handheld wireless telephone 100a used for data control (RS232 DTR) and connected to pin 9 |
| 12 | Audio to handheld wireless telephone 100a |
| 13 | Data from handheld wireless telephone 100a used for data control (RS232 CD) |
| 14 | Audio from handheld wireless telephone 100a |
| 15 | Ground for power |
| 16 | Signal ground |

In operation, the control 706a' of the connecting sleeve 104a' signals the handheld wireless telephone 100a to enter a diagnostic mode. The control 706a' then polls the handset using a diagnostic protocol specific to the model of handheld wireless telephone 100a. The control 706a' performs this function by sending and receiving a serial data stream via telephone specific connector 702a', as detailed, for example, in Table 4 above. In response, the handheld wireless telephone 100a returns to the control 706a' encoded information in a long binary sequence. The encoded information provides details regarding incoming and outgoing telephone calls, the state of the handheld wireless telephone 100a (e.g., whether it is ready to send and receive communication signals), and the display 101a of the handheld wireless telephone 100a. The control 706a' then translates the long binary sequence received from the handheld wireless telephone 100a into data for the control 750' of the main controller box 105' using a standardized control 706a' to control 750' protocol. This information is used in turn by the control 750' of the main controller box 105' to provide for the operational features of the docking station 102'.

FIG. 28 illustrates how the handheld wireless telephone 100a, the connecting sleeve 104a' and the main controller box 105' fit together. The data bus connector 830a' is inserted into the corresponding data bus connector 752'. At the same time, the male clip 834a' is inserted into the female clip 778', forming a snap fit. This connection may be pulled apart by exerting opposing forces on the main controller box 105' and connecting sleeve 104a', respectively, at the same time.

The connecting sleeve 104a' has a retainer, which may be in the form of a cup-shaped receiving surface 506a', for retaining the handheld wireless telephone 100a. The cup-shaped receiving surface 506a' is substantially the same size and shape as a surface, typically the base 504a', of the handheld wireless telephone 100a having a data bus connector. The data bus connector 702a' is positioned on the receiving surface 506a' so that it contacts and forms an electrical connection with the data bus connector of the handheld wireless telephone 10a when the handheld wireless telephone 100a is retained by the receiving surface 506a'. The receiving surface is different for connection sleeves configured for different makes and models of handheld wireless telephone. For example, referring to FIGS. 28, 29, 30, 31 and 32, receiving surface 506b' is formed differently than receiving surface 506a' because connecting sleeve 104a' is designed for a different make and model of handheld wireless telephone 100a. The handheld wireless telephone 100a is held in place in the connecting sleeve 104a' by gravity and/or friction depending on the type of handheld wireless telephone connector. Thus the connection between the telephone specific connector 702a' and a corresponding connector on a handheld wireless telephone 100a is maintained by gravity and/or friction depending on the type of handheld wireless telephone connector.

As shown in FIG. 28, different configurations of connecting sleeve 104a', 104b' may be used to accommodate various makes and models of handheld wireless telephones using a standard main controller box 105'.

The flow diagrams of FIGS. 11, 12, 13 and 14, also illustrate functionality of the second embodiment.

Referring to FIG. 11, the initial start-up routine of the docking station 102' is illustrated. In step S-1, electricity flows from the power source 114 to the connecting sleeve 104a'. In step S-2, the controls 706a', 750' signal the power status indicator LEDs 204', 714a' to illuminate green if power is supplied to the main controller box 105' and connecting sleeve 104a', respectively. If no power is available, the power status indicator LEDs 204', 714a' remain off. One or both of the RJ-11 telephone jacks 401', 402' are used in step S-3 to connect the docking station 102' to a conventional telephone system 106 and/or a standalone conventional telephone 112.

In conjunction with the voltage detector 208', the control 750' evaluates whether voltage is present in the wireline (step S-4). If voltage is present, then the control 750' instructs the connection status indicator LED 210' to display a flashing red warning light as indicated in step S-5. The control 750' then signals the disconnect 760' to disconnect the docking station 102' from the wireline telephone system 106 and/or standalone wireline telephone 112 (step S-6). A relay or similar method is used to totally isolate the docking station 102' from the wireline. The docking station 102' will not operate if wireline telephone service is also connected to the wireline telephone system 106. If the wireline telephone system 106 is not connected to a landline then voltage is not present in the landline (step S-4) and the control 750' causes the connection status indicator LED 210' to turn green, indicating that the docking station 102' has connected to the existing wireline telephone system 106 successfully (step S-7).

The control 750' then queries the sleeve control 706a' to determine if the handheld wireless telephone 100a is turned on and is properly engaged with the connecting sleeve 104a' and main controller box 105' (step S-8). If the handheld wireless telephone 100a is set properly in the connecting sleeve 104a' and an accessible authorized wireless telephone network is available (step S-9), then the control 706a' signals the ready status indicator LED 716a' to turn green (step S-10). The control 750' signals the UI tone generator 758' to send a dial tone signal to any connected wireline telephone 111, 112 that has its receiver 113 lifted. When a telephone call is in progress, the control 706a' will signal the ready status indicator LED 716a' to flash green on and off repeatedly. If the handheld wireless telephone 100a is not set properly, or not turned on (step S-8), or if an authorized wireless telephone network is not available (step S-9), then the ready status indicator LED 716a' illuminates red (step S-11). If a receiver 113 of any telephone 111, 112 connected to the docking station 102' is lifted, no sound is generated by the docking station 102' and the docking station 102' can not be used to send and receive telephone calls.

Referring to the flow chart diagram in FIG. 12, the receiver 113 of one or more of the wireline telephones connected to the docking station 102' via the RJ-11 telephone jack 222' is lifted in step S-100 and the control 750' senses that the line is open in step S-101. The control 750' evaluates whether an authorized wireless telephone service is available (step S-102) as described in FIG. 11. If service is available, then the control 750' signals the UI tone generator 758' to generate a dial tone, as illustrated in step S-103. This indicates to the user that the docking station 102' is ready for use.

If an incoming call is received (step S-120) any time after a dial tone is generated (step S-103), but before the handheld wireless telephone 100a is instructed by the control 750' to begin dialing a telephone number (step S-107), then the control 750' queues the outgoing call (step S-122) until the incoming call is re-directed to voice mail (step S-124). Once the incoming call has been re-directed to voice mail (step S-124), the control 750' instructs the handheld wireless telephone 100a to dial the outgoing telephone number (step S-107). The control 750' then sends an initiating "SEND" command to the handheld wireless telephone 100a (step S-107). If in step S-120 no incoming call is received, then processing continues as set out below.

In step S-104, the user inputs a telephone number in a conventional manner using a wireline telephone 111, 112 connected to the docking station 102'. The docking station 102' receives the DTMF or pulse signals and decodes them using the DTMF decoder 226' in step S-105. To ensure that the user has completed the dialing sequence, the control 750' waits for a specified period of time, such as 3 or 4 seconds (step S-106). Once a specified time-out period has elapsed, the control 750' signals the handheld wireless telephone 100a via the data bus connector 752' and the connecting sleeve 104a' to dial the inputted digits. The control 750' then sends an initiating "SEND" command to the wireless telephone 100a (step S-107). The telephone call is then connected in step S-108 and the control 750' then evaluates whether the call has been ended. When a 911 emergency call is placed (steps not shown), the control 750' does not wait for the time out period to elapse. Instead, the call is connected immediately.

In step S-109, the control 750' evaluates which party released the call. If the docking station 102' user ends the call, then the control 750' in step S-110 sends the "END" command to the handheld wireless telephone 100a and the docking station 102' returns to the idle state (step S-111). If the opposite party ends the telephone call, then the call will be terminated by the handheld wireless telephone 100a (step S-112) and the docking station 102' returns to an idle state (step S-111).

If in step S-102 the control 706a' determines that no authorized wireless service is available, then processing stops and no dial tone is transmitted (step S-113) to the connected wireline telephones 111, 112.

FIG. 13 details the sequence of steps required to complete an inbound call. In step S-200, the handheld wireless telephone 100a receives a signal from the wireless telephone network. In step S-210, if the receiver 113 of an attached wireline telephone 111, 112 is already lifted but not on a call, the docking station 102' will not send a ringing signal to any of the other attached wireline telephones 111, 112. This situation might occur if the user is in the process of dialing a telephone number on for example wireline telephone 112 and the handheld wireless telephone 100a receives an inbound telephone call. In this instance, an "END" command is sent by the control 750' to the handheld wireless telephone 100a to put the ringer on the handheld wireless telephone 100a in silent mode (step S-212). If the wireline telephone 111, 112 remains off-hook (step S-214), then the incoming telephone call is sent to voice mail (step S-216). The outgoing call then proceeds as described for FIG. 12. If the user hangs up the wireline telephone 112 while the handheld wireless telephone 100a is still in termination condition or silent ring state, the wireline telephone 112 rings (step S-202).

For incoming calls, as long as no receiver 113 of an attached wireline telephone 111, 112 is lifted, the control 750' signals the SLIC to send a ring signal to an attached wireline telephone 112 or system of wireline telephones 106 (step S-202). The attached wireline telephone 111, 112 rings in step S-203 and caller identification data, if available, is sent from the handheld wireless telephone 100a to the conventional telephone in step S-204. When the wireline telephone is answered, the control 750' initiates a "SEND" command to the handheld wireless telephone 100a, which connects the telephone call (step S-205). The remainder of the call follows the same steps as set out in FIG. 12 from step S-109 onwards.

Figure 27:
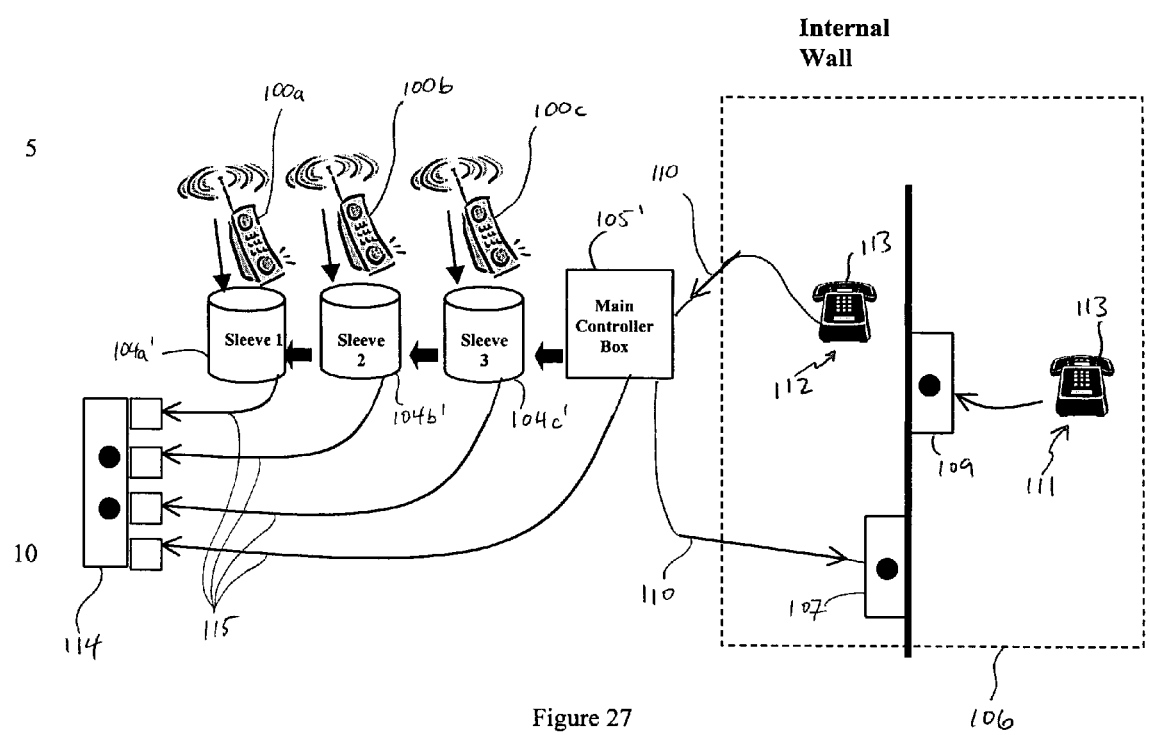
FIG. 27 is a diagram of a typical installation of a docking station according to a second embodiment of the invention, showing the main controller box with three connecting sleeves.

Referring to FIGS. 27 and 28, the main controller box 105' may be connected to several handheld wireless telephones 100a, 100b, 100c at a time by adding connecting sleeves 104a', 104b', 104c'. In the second embodiment, up to five connecting sleeves (not shown) may be connected to one main controller box 105'. For this purpose, each connecting sleeve 104a', 104b', 104c' has female data bus connectors 832a', 832b' and female clips 840a', 840b' (components of all additional sleeves are substantially the same as for sleeve 104a'; components for connecting sleeve 104c' are not shown). The female connector 832a' and female clip 840a' are on the opposite side of the connection sleeve 104a' to the male connector 830a' and male clip 834a'. The data bus connector 832a' and clip 840a' are substantially the same as the data bus connector 752' and clip 778' of the main controller box 105'. By having a male connector 830a' and clip 834a' on one side and a female connector 832a' and clip 840a' on the other, connecting sleeves 104a', 104b', 104c' may be connected in series to one another with the first connecting sleeve 104a' being connected to the main controller box 105'. Additional connecting sleeve 104b' is connected to connecting sleeve 104a' in the same manner that connecting sleeve 104a' is connected to the main controller box 105'. Subsequent connecting sleeves are connected in this manner. Data and audio signals between the added connecting sleeve 104b' and the main controller box 105' are transmitted by intermediary sleeve 104a' via data bus 708a' (see FIG. 15). Data bus 708a' forms a conduit between data bus connectors 830a' and 832a'.

By adding connecting sleeves, for example connecting sleeve 104b', multiple handheld wireless telephones 100b may be used to send and receive telephone calls using the wireline telephones 111, 112. The first connecting sleeve 104a' connected to the main controller box 105', becomes the primary sleeve. When a subsequent sleeve is connected, the controller 750' electronically communicates with the additional connecting sleeve 104b' via the data bus connector 752' and assigns a line number to the added connecting sleeve 104b', (e.g., 2, 3 for each additional connecting sleeve 104b', 104c', respectively). Once connected, the controller 750' automatically configures itself to manage the additional connecting sleeve 104b'. If the power supply to one of the additional connecting sleeves, for example 104b', is disconnected, voice and data signals will still be transmitted between the additional handheld wireless telephone 100b and the conventional wireline telephones 111, 112. However, the LEDs 714b' and 716b' of connecting sleeve 104b' will not be operational and the battery (not shown) in the added handheld wireless telephone 100b will not be recharged. Distinctive ring signals are generated by the main controller box 105' to distinguish incoming telephone calls from different handheld wireless telephones 100a, 100b connected to the main controller box 105'.

If an incoming call is received by one of the handheld wireless telephones 100a, 100b while a call is already in progress, caller identification and call waiting information, if available, are forwarded to the conventional wireline telephones 111, 112 by the docking station 102'. If the second call is not answered, it will be routed to the voicemail associated with the handheld wireless telephone receiving the second call, if available.

Outgoing calls are processed in the same manner as for a main controller box 105' connected to just one connecting sleeve 104a'. The handheld wireless telephone 100a connected to the primary connecting sleeve 104a' is automatically used to place the telephone call. Alternatively, a particular handheld wireless telephone 100b may be chosen by pressing the star key "*" on the wireline telephone 111, 112 followed by the number of the handheld wireless telephone. This will cause the control 750' to use the corresponding handheld wireless telephone to make the call (steps not shown). For example, if the sequence "*2" is entered, then the second handheld wireless telephone 104b' will be used to make the outgoing call.

The docking station 102' may be configured to simulate any of the features available on conventional telephone networks such as multi-party conferencing, call hold, call mute, call forwarding, fax notification, net mail notification voice mail, one touch voice mail retrieval, caller identification, short message service (SMS, which must be viewed directly on the display 101a of the handheld wireless telephone 100a) and call waiting. For connected wireline telephones 111, 112 with displays (not shown), such as the Vista 350 telephone manufactured by Nortel Networks Corporation of Brampton, Ontario, the docking station 102' flows through relevant data received from the handheld wireless telephone 100a to the connected wireline telephones 111, 112.

For example, FIG. 14 illustrates how the call waiting function of the docking station 102' is achieved. Step S-300 begins when a call is already in progress. In step S-301, a call waiting signal is received by the handheld wireless telephone 100a, which is transmitted to the control 750'. The control 750' signals an attached wireline telephone 112 or system of telephones 106 in step S-302. Caller ID data may also be sent (step S-303). In step S-304, the wireless telephone network evaluates whether the second call is answered. If the second call is not answered, the call is routed to voicemail, if available, using the wireless telephone network (step S-305).

The second call is answered by the user tapping the telephone's hook switch (not shown) or selecting the flash key (not shown) on the wireline telephone (step S-306). The hook switch or flash signal is decoded and sent to the handheld wireless telephone 100a (step S-307), and the second call is answered (step S-308) and the first call is put on hold (step S-309). This process may be repeated to switch between the first and second calls following steps S-306 through to S-310. When one of the calls is abandoned (step S-310), the other call may be continued (step S-311). The termination the abandoned call is achieved in the same manner as set out in FIG. 12 from step S-109 through to step S-111. The continued call (step S-311) is similarly ended (step S-312).

It will be understood by those skilled in the art that this description is made with reference to the preferred embodiments and that it is possible to make other embodiments employing the principles of the invention which fall within its spirit and scope as defined by the following claims.

What is claimed is:

1. A docking station for operation as part of a handheld wireless telephone system, the system including a wireline telephone installation and a handheld wireless telephone, said docking station being operable to interface the wireline telephone installation to the handheld wireless telephone, said docking station comprising:
    translation means for translating communication signals between the handheld wireless telephone and the wireline telephone;
    a main controller box incorporating a data bus connector;
    the translation means incorporating a first translation means for translating communications signals transmitted between the handheld wireless telephone and the main controller box and a second translation means for translating communication signals between the main controller box and the wireline telephone;
    a releasable connecting module removably connected to the main controller box, the releasable connecting module being used to connect the handheld wireless telephone to the main controller box and the releasable connecting module having retaining means for retaining the handheld wireless telephone to the releasable connecting module;
    the first translation means being located in the releasable connecting module, and the second translation means being located in the main controller box;
    the releasable connecting module comprising a first data bus connector for connection to a corresponding data bus connector in the handheld wireless telephone and a second data bus connector for connection to the data bus connector in the main controller box;
    the retaining means comprising a portion of a surface of the releasable connecting module defining a cup, the cup having an interior surface being substantially the same shape and size as a surface of the handheld wireless telephone having a data bus connector, the cup further comprising the first data bus connector for connection to the data bus connector of the handheld wireless telephone, whereby the first data bus connector contacts the data bus connector of the handheld wireless telephone when the handheld wireless telephone is inserted into the cup;
    the main controller box incorporating a locking device for connection to the releasable connecting module and the releasable connecting module additionally comprising a corresponding locking device for connection to the locking device of the main controller box;
    the cup being physically configured to connect a particular make and model of handheld wireless telephone to the main controller box;
    the first data bus connector being physically configured to connect to the corresponding data bus connector in the handheld wireless telephone;
    the first translation means translates signals between a particular make and model of handheld wireless telephone and the main controller box;
    the releasable connecting module additionally comprising means for connecting to a second releasable connecting module; and
    wired means for connecting the docking station to the wireline telephone.

2. The docking station as claimed in claim 1, wherein the wireline telephone forms part of a system of wire line telephones.

3. The docking station as claimed in claim 1, wherein the translation means is located within the main controller box.

4. The docking station as claimed in claim 1, wherein the translation means is located within the releasable connecting module.

5. The docking station as claimed in claim 1, wherein the handheld wireless telephone is retained in the cup by gravity.

6. The docking station as claimed in claim 1, wherein the handheld wireless telephone is retained in the cup by friction.

7. The docking station as claimed in claim 1, wherein the main controller box is connected to at least two releasable connecting modules so that communication signals may be translated between the wireline telephone and one of at least two handheld wireless telephones each of which is retained by one of the at least two releasable connecting modules.

8. The docking station as claimed in claim 1, wherein the docking station is configured to translate communication signals between the handheld wireless telephone and the wireline telephone when the communication signals are received and sent by the handheld wireless telephone to and from a wireless telephone network.

9. The docking station as claimed in claim 8, wherein the wireless telephone network is a digital PCS network.

10. The docking station as claimed in claim 8, wherein the wireless telephone network is a AMPS network.

11. The docking station as claimed in claim 8, wherein the wireless telephone network is a CDMA network.

12. The docking station as claimed in claim 8, wherein the wireless telephone network is a GSM network.

13. The docking station as claimed in claim 8, wherein the wireless telephone network is a TDMA network.

14. The docking station as claimed in claim 8, wherein the wireless telephone network is an iDEN™ network.

15. The docking station as claimed in claim 1, further comprising a serial connection means for connecting a computer to the docking station so that the computer may access a wireless telephone network.

16. The docking station as claimed in claim 1, further comprising an Ethernet connection means for connecting a computer network to the docking station so that the computer network may access the wireless telephone network.

17. The docking station as claimed in claim 1, wherein the main controller box further comprises a communication means for simulating communication signals that make it appear to users of the wireline telephone that the wireline telephone is connected to a landline telephone network.

18. The docking station as claimed in claim 17, wherein the communication means simulates at least the following features available on conventional telephone networks: multi-party conferencing, call hold, call mute, call forwarding, fax notification, net mail notification voice mail, one touch voice mail retrieval, caller identification, short message service and call waiting.

19. The docking station as claimed in claim 18, the communications means further comprising a dial tone generator, a busy tone generator, a ring generator and a DTMF decoder.

20. The docking station as claimed in claim 18 wherein the wireline telephone is connected to the wired means, and the handheld wireless telephone is connected to the releasable connecting module.

21. The docking station as claimed in claim 20, wherein the wired means comprise at least one telephone jack located in the side of the main controller box.

22. The docking station as claimed in claim 21, wherein the communication means further comprises a voltage circuit detection means to detect whether voltage is present in the connection to the wireline telephone, and, if voltage is detected by the voltage circuit detection means, then the voltage circuit detection means causes the docking station to be electrically isolated from the landline telephone network.

23. The docking station as claimed in claim 22, further comprising a first power status LED for indicating that the releasable connecting module is connected to a power source, a second power status LED for indicating that the main controller box is connected to a power source, a connection status indicator LED for indicating that voltage is not present in the connection to the wireline telephone, and a ready status indicator LED for indicating that the docking station is ready to translate communication signals between the handheld wireless telephone and the wireline telephone.

24. The docking station as claimed in claim 23, comprising a battery charger for charging the battery on the handheld wireless telephone.

25. The docking station as claimed in claim 24, wherein the communication means further comprises a signal restriction means for restricting signals that may be translated by the docking station to those of at least one wireless telephone network service provider.

26. The docking station as claimed in claim 25, wherein the main controller box additionally comprises a flash memory for upgrading and maintaining the communication means and the second translation means.

27. The docking station as claimed in claim 26, wherein the translation means additionally comprises a flash memory for upgrading and maintaining the first translation means.

* * * * *